(12) United States Patent
Paolozzi et al.

(10) Patent No.: US 12,275,026 B2
(45) Date of Patent: Apr. 15, 2025

(54) SYSTEMS AND METHODS FOR UNIVERSAL TIRE DRESSING APPLICATION

(71) Applicant: Paolozzi Investments, Inc., Vienna, VA (US)

(72) Inventors: Guy Anthony Paolozzi, Vienna, VA (US); Nicholas Noah Bush, Chagrin Falls, OH (US)

(73) Assignee: Confinity Robotics, LLC, Chagrin Falls, OH (US)

( * ) Notice: Subject to any disclaimer, the term of this patent is extended or adjusted under 35 U.S.C. 154(b) by 16 days.

(21) Appl. No.: 17/660,608

(22) Filed: Apr. 25, 2022

(65) Prior Publication Data

US 2022/0379332 A1 Dec. 1, 2022

Related U.S. Application Data

(60) Provisional application No. 63/190,297, filed on May 19, 2021.

(51) Int. Cl.
*B05B 12/00* (2018.01)
*B05B 12/16* (2018.01)
*B05D 1/02* (2006.01)
*B25J 11/00* (2006.01)
*G06T 7/60* (2017.01)

(52) U.S. Cl.
CPC .......... *B05B 12/004* (2013.01); *B05B 12/16* (2018.02); *B05D 1/02* (2013.01); *B25J 11/0075* (2013.01); *G06T 7/60* (2013.01); *G06T 2207/10028* (2013.01); *G06T 2207/20061* (2013.01)

(58) Field of Classification Search
None
See application file for complete search history.

(56) References Cited

U.S. PATENT DOCUMENTS

| 4,971,084 | A  | 11/1990 | Smith et al.     |
|-----------|----|---------|------------------|
| 5,054,918 | A  | 10/1991 | Downing et al.   |
| 5,497,797 | A  | 3/1996  | Meyer            |
| 6,383,295 | B1 | 5/2002  | Federick et al.  |
| 6,660,335 | B2 | 12/2003 | Mattia et al.    |
| 7,285,169 | B2 | 10/2007 | Mattia et al.    |
| 7,582,164 | B1 | 9/2009  | Krause et al.    |
| 8,379,925 | B2 | 2/2013  | Schilling et al. |
| 8,383,207 | B2 | 2/2013  | Falbaum et al.   |
| 9,102,055 | B1 | 8/2015  | Konolige et al.  |

(Continued)

FOREIGN PATENT DOCUMENTS

| WO | 2018208911 A1 | 11/2018 | |
| WO | WO-2020152440 A1 * | 7/2020 | ......... G01B 11/2433 |

OTHER PUBLICATIONS

International Search Report & Written Opinion issued in corresponding PCT application No. PCT/US2022/029978 dated Aug. 17, 2022, 13 pages.

*Primary Examiner* — Michael P. Rodriguez
(74) *Attorney, Agent, or Firm* — Tucker Ellis LLP

(57) ABSTRACT

Systems and methods disclosed are directed to receiving an image; performing an analysis on the image via one or more algorithms; generating tire and rim data based on an outcome of the analysis; transmitting one or more instructions including actuation of an end effector that is configured to apply tire dressing to a tire; and actuating an end effector that is configured to apply the tire dressing to the tire in accordance with the one or more instructions.

11 Claims, 34 Drawing Sheets

(56) References Cited

U.S. PATENT DOCUMENTS

| | | |
|---|---|---|
| 9,302,653 B2 | 4/2016 | Kohonen et al. |
| 10,475,201 B1 | 11/2019 | Hall et al. |
| 2006/0275550 A1 | 12/2006 | DeBoer et al. |
| 2007/0068554 A1 | 3/2007 | Essenburg |
| 2007/0127808 A1 | 6/2007 | McAllister |
| 2008/0178402 A1 | 7/2008 | Martines et al. |
| 2010/0272370 A1* | 10/2010 | Schilling .................. G06T 7/62 |
| | | 382/199 |
| 2018/0326446 A1* | 11/2018 | Anderson ............... B05C 21/00 |

* cited by examiner

SYSTEMS AND METHODS FOR UNIVERSAL TIRE DRESSING APPLICATION

TECHNICAL FIELD

The present disclosure relates to systems and methods for tire dressing application, and more particularly, to systems and methods for applying tire dressing to exterior walls of vehicle tires.

BACKGROUND

Tire dressing is a chemical product applied to a surface of a vehicle tire to restore tire rubber that tends to fade over time. It provides an attractive shine and protective coating and is typically applied to vehicle tires after they have been washed. Conventional tire dressing machines operate by spraying a liquid tire dressing onto the tire with a pressurized mist or by using saturated media contact transfer as the vehicle passes by the machine.

The media contact transfer method is the most common of the methods utilized in the professional car detailing industry. A chemical pump or a reservoir dispenses the tire dressing chemical onto an open-cell roller, a bristle brush, or a pad type transfer media. The transfer media may be rotationally powered or static. The misting spray method generally uses a spray bar apparatus in fluid communication with a chemical pressure pump and that simply sprays the tire as its passes by the apparatus. However, these conventional spray systems do not apply the dressing in a very accurate or controlled manner. Thus, the tire dressing chemical mist ends up on the floor as a slippery hazard, gets sprayed on the wheel leaving an undesirable finish, or may even may get pulled into nearby vehicle drying blowers and then be redeposited on the paint surfaces generally as an undesirable oily type film on the vehicle. Additionally, these conventional systems cannot distinguish between low profile tires, small tires, or large tires, and end up applying much of the tire dressing chemical to the wheels, tire rims, vehicles' fenders, or may not apply adequate dressing to a large profile tire. This is wasteful, causes running or "sling" and may require some manual cleanup or touchup These and other deficiencies exist.

BRIEF SUMMARY

Embodiments of the present disclosure provide tire dressing application system including a controller. The system may include one or more imaging devices coupled to the controller. The system may include one or more tire dressing machines coupled to the controller. The one or more image devices may be configured to capture image data of a tire and transmit the image data to the controller. The controller may be configured to perform, via one or more algorithms, an analysis on the image data received from the one or more imaging devices and transmit, based on the analysis, one or more instructions to the one or more tire dressing machines to apply tire dressing to the tire.

Embodiments of the present disclosure provide a method for applying tire dressing. The method may include capturing, by an imaging device, image data of a tire. The method may include transmitting, by the imaging device, the image data to a controller. The method may include performing, by the controller, an analysis on the image data via one or more algorithms. The method may include generating, by the controller, tire and rim data based on an outcome of the analysis. The method may include transmitting, by the controller, one or more instructions including actuation of an end effector that is configured to apply tire dressing to a tire. The method may include actuating, by the one or more tire dressing machines, the end effector that is configured to apply the tire dressing to the tire in accordance with the one or more instructions, the end effector being movable along a plurality of axes.

Embodiments of the present disclosure provide a computer readable storage medium comprising computer program code instructions, being executable by a computer, for: receiving an image; performing an analysis on the image via one or more algorithms; generating tire data based on an outcome of the analysis; and transmitting one or more instructions to apply tire dressing to a tire.

BRIEF DESCRIPTION OF THE DRAWINGS

FIGS. 12-17 illustrate various features of a distribution system according to an example embodiment.

FIG. 13 illustrates a component of a distribution system according to an example embodiment.

FIG. 14 illustrates various components of a distribution system according to an example embodiment.

FIG. 15 illustrates components of the distribution system according to an example embodiment.

FIG. 16 illustrates additional components that may be included in the distribution system according to an example embodiment.

DETAILED DESCRIPTION

Figure 1:
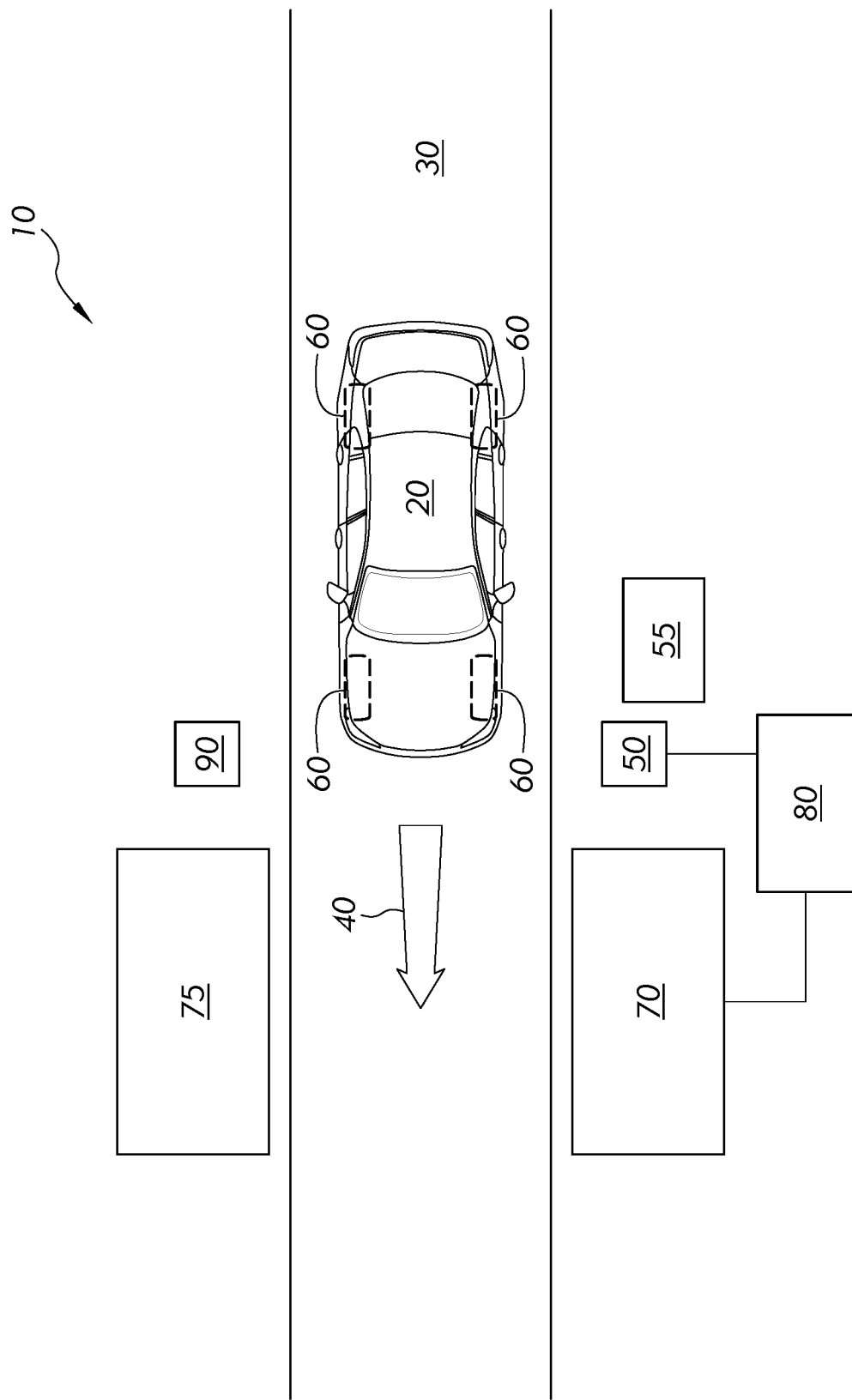
FIG. 1 illustrates a schematic diagram of a tire dressing application system according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Throughout the drawings and the detailed description, unless otherwise described, the same drawing reference numerals can be understood to refer to the same elements, features, and structures. The relative size and depiction of these elements may be exaggerated for clarity, illustration, and convenience.

Example embodiments are described and illustrated herein. These illustrated examples are not intended to be a limitation on the present embodiments. For example, one or more aspects of the system can be utilized in other embodiments and other types of appliances. Such systems may, however, be embodied in many different forms and should not be construed as limited to the embodiments set forth herein. Like, but not necessarily the same, elements in the various figures are denoted by like reference numerals for consistency. Terms such as "first," "second," "front," and "rear" are used merely to distinguish one component (or part of a component or state of a component) from another. Such terms are not intended to denote a preference or a particular orientation.

FIG. 1 illustrates a schematic diagram of a tire dressing application system 10 according to an example embodiment. The system 10 may include a vehicle 20, a conveyor 30, a first imaging device 50, a first tire dressing machine 70, a second tire dressing machine 75, a controller 80, and a second imaging device 90. Although FIG. 1 illustrates single instances of the components of system 100 system 10 may include any number of components.

The vehicle 20 may comprise any type of vehicle. The vehicle 20 may include a plurality of tires 60. As illustrated in FIG. 1, vehicle 20 includes four tires 60. However, it is understood that vehicle 20 may include any number of tires 60. The system 10 may be configured to apply an optimized amount of tire dressing to a sidewall of one or more tires 60. In some examples, the system 10 may be configured to apply the optimized amount of tire dressing whether the tire 60 is moving or stationary, and also accurately and safely. The system 10 may be configured to detect, measure, and accommodate a variety of sidewall dimensions or sizes, including but not limited to by varying a spray pattern or size of spray of the tire dressing, as further described herein. Additionally, the system 10 may be configured to accommodate a variety of sizes of tires 60. Wide sidewalls can be accommodated by adding nozzle rotations around the tire 60, for which each rotation is offset and/or a slightly different size than the previous rotation. Additionally or alternatively, movement of the system 20 in the z-direction may be used to add to or decrease a width of spray during each pass around the tire 60 to accommodate different tire sizes.

In some examples, a vehicle 20, such as a car or truck, may travel through or into an automated car wash, such as a tunnel car wash. A conveyor 30 may be configured to carry the vehicle 20 through the tunnel in a direction as indicated by arrow 40. It is understood that the conveyor 30 may carry the vehicle 20 through the tunnel in other directions relative to the direction as indicated by arrow 40. The conveyor 30 may comprise a conveyor system. For example, the conveyor 30 may comprise a flat belt conveyor system without guide rails.

It is to be appreciated that the embodiment described herein is merely an example and that the system 10 may also be employed in a non-conveyor or in-bay car wash, or in any type of automated car wash system that moves the vehicle 20 using an external mechanism, such as a conveyor or belt, with or without guide rails or the like. Alternatively, the vehicle 20 may be stationary, such as the case of an in-bay or self-service car wash, in which the system 10 is configured to capture images, including but not limited to image data of a tire(s) 60, and apply the tire dressing to a non-moving tire or set of tires 60. The system 10 may also be configured for integration in an automated car wash in which the vehicle is parked in neutral and conveyed at a predetermined velocity. Thus, the rotation of the tire would need to be incorporated and velocity parameters of the system 10 would be adjusted based on the known movement of the rail and known movement of the tire, namely accounting for speed of the conveyor 30 and the speed of the rail as the tire 60 moves along. Here, the speed of the conveyor 30 as well as the speed of the rotation of the tire 60 would be added. Because different size of tires rotate at different speeds, and this would vary based on the diameter of the tire. And the system 10 may be configured to account for these variables in the data stack, as further described below. The system 10 may be configured to calculate the outside diameter of the tire 60, then calculate the rate of rotation of the tire 60 based on the speed the overall conveyor is moving. System 10 may thus be configured to be universally applied and integrated with any type of conveyor or non-conveyor apparatuses. In some examples, rolling or static conveyors may be used. If a static conveyor type is used, the rotational velocity of the wheels is zero. If a rolling type conveyor type is used, then the rotating velocity may be calculated. Further, and without limitation, the system 10 is universally applicable to and can be integrated with any type of vehicle, any type of facility, tire type and/or size, rim color type and/or size. In particular, the system 10 may be configured to account for moving or stationary vehicles. For moving vehicles, this may include rotating or non-rotating wheels. For all vehicles, whether moving or stationary, this may include, for example: vehicles at an angle relative to the tire dressing machine(s) 70, 75 or parallel to the tire dressing machine(s) 70, 75; and/or wheels of the vehicle at an angle relative to the tire dressing machine(s) 70, 75 or parallel to the tire dressing machine(s) 70, 75. Additionally, the system can be self-sufficient, in that data does not need to be transmitted to the system 10 from other systems (for example, such as a belt controller or the like). Moreover, the system 10 may be configured to detect black rims on black tires. Yet further, the system 10 may be configured to implement various advanced safety solutions, as further described below, including but not limited to: z-axis approaches the wheel(s) only when collision geometries have been cleared and/or immediately instructing retraction when spray application is completed; retracting the z-axis if a collision is sensed or anticipated; and constructing end effectors that are configured to break away and/or absorb collision to avoid damage. Still further, system 10 may be configured to be rotated by a predetermined amount, such as 180 degrees in any direction, so as to allow for application of the tire dressing on an opposite side of the vehicle, as opposed to the system 10 being only configured for application of the tire dressing on independent left and right (for example, driver and passenger) sides. In some examples, such a configuration is advantageous for not only allowing a tolerable offset, but also for accommodating any number of unique obstructions that may be encountered or present in the car wash tunnel or bay.

A first imaging device 50, such as a camera, may be positioned at or near the conveyor 30. The first imaging device 50 may be configured to detect when a tire 60 of the vehicle 20 passes in front of the first imaging device 50. Preferably, only one imaging device 50 may be positioned at one side of the conveyor 30. However, if desired, at least two imaging devices 50, such as two cameras, may be employed, one positioned on each side of the conveyor 30. In some examples, the imaging devices 50 may be positioned on opposite sides of the conveyor 30. The imaging devices 50 may or may not be positioned directly opposite to each other on each side of the conveyor 30. The first imaging device 50 preferably includes a depth camera, which is configured to output one or more images as pixels with different numerical values associated with each, the numerical value representing a distance of an object from the camera. An example of a depth camera that may be used with the present system is the Intel® RealSense® camera. By using a depth camera to image each of the tires 60, the first imaging device 50 may be configured to recognize an alignment or rotation of each tire 60 with respect to a vertical plane, as will be described in greater detail below.

In one embodiment, in place of the first imaging device 50 or depth camera, one or more depth sensors 55 may be configured to measure distances to objects and utilized on one or more sides of the conveyor 30, either independent from or in conjunction with a second imaging device 90. The second imaging device 90 may comprise a 2-dimensional camera. In another embodiment, the system 10 may be configured to utilize the one or more depth sensors 55 on either or both sides of the vehicle, independent of any of the first and/or second imaging devices 50, 90. In some examples, the technique for capturing depth data, whether from any of the imaging devices 50, 90 or independent depth sensor 55, may include one or more selected from the group of: stereo photography, LIDAR, structure light approaches, or time of flight cameras using infrared or ultrasonic sensing.

Additionally, or alternatively, one or more imaging devices 50, 90 can be configured to detect a shape of each tire 60. When an alignment or rotation of the tire 60 with respect to a vertical plane is angled, the shape is detected as an ellipse. The ellipse shape is then used to calculate the geometry of each tire 60 for application of the tire shine material. For example, the system 10 can employ at least two 2-D cameras, with a first camera positioned further upstream and at a preset angle with respect to a second camera. Images taken from both cameras can then be used to determine the alignment or rotation of the tires 60.

The controller 80 may include a memory and a processor. In some examples, the controller 80 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. The controller 80 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

It is understood that the processing circuitry of the controller 80 may contain additional components, including processors, memories, error and parity/CRC checkers, data encoders, anticollision algorithms, controllers, command decoders, security primitives and tamperproofing hardware, as necessary to perform the functions described herein. The controller 80 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

The memory may be a read-only memory, write-once read-multiple memory or read/write memory, e.g., RAM, ROM, and EEPROM, and the controller 80 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The processor may be configured to receive data from any of the components of system 10. The memory may be configured to store the data.

In some examples, the controller 80 may be operably connected to the first imaging device 50. The controller 80 may be configured to, via the first imaging device 50, determine a size, position, angle, and camber of a tire 60 relative to the conveyor 30 and/or tire dressing machine(s) 70, 75, the position of potential collision surfaces, as well as the rate at which the tires 60 are moving and/or rotating with the conveyor 30. In some examples, the controller 80 may be configured to determine whether the vehicle 20 is disposed on the conveyor 30 with straight wheels, for example ensuring whether the vehicle wheels are placed on the conveyor 30 substantially parallel or parallel to an edge of the conveyor 20, in order to ascertain whether or not to measure the angle and/or camber of the tire 60. In an alternative embodiment, physical devices or guides can be used to assist vehicle operators to place the vehicle in parallel to the tire dressing machine, thus obviating the need to measure the angle of the tire. As will be explained in greater detail below, the controller 80 may be configured to implement the Hough Transform technique, a type of feature extraction technique, to detect shapes, such as circles, in the image taken by the first imaging device 50. In conjunction with but separate from the Hough Transform and distance measurements, the controller 80 may be configured to utilize additional technique, including but not limited to edge or ridge detection, corner detection, blob detection, structure tensor, affine shape adaptation, and/or filtering techniques. The application of these additional techniques by the controller 80 may be configured to enhance or simplify the tire dressing application process, thereby improving system 10 performance, tire dressing application precision, and also operational efficiency. Based on the application of one or more of these techniques by the controller 80, the system 10 may be provided with information on where a tire 60 of the vehicle 20 is located, the sizes of both the tire 60 and rim, the orientation of the plane of the tire 60 closest to one or more of the tire dressing machines 70, 75, and the rate at which a wheel (or tire 60) is moving and rotating.

Figure 3:
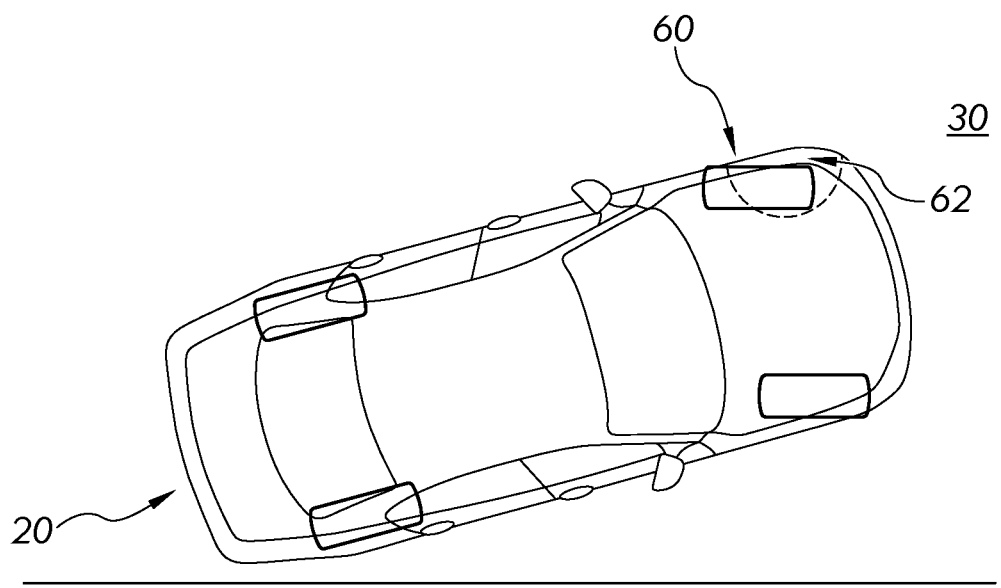
FIG. 3 illustrates a schematic of a vehicle positioned relative to a conveyor according to an example embodiment.

For determining black rims next to black tires, pixel-specific feature identification techniques, such as edge detection, may be used where blob processing tends to lack sufficient specificity to discern the boundary of each. In some examples, the edges on black rims may be identified, and this may be challenging because they may not be as defined as would be with a non-black rim. For example, a different set of image filters may be used to edge detect the black rim. In addition, certain rim features, such as spokes or lugs, which may be useful to the tire dressing application process, may be identified using these single-pixel techniques. Based on data obtained from the first imaging device 50, depth sensor 55, and/or second imaging device 90, the system 10 may be configured detect when the imaged tire 60 is not parallel to an edge of the conveyor 30, or to a predetermined vertical plane and may be configured to calculate the angle of tire 60. The tire 60 may be angled relative to the edge of the conveyor 30 and/or x-axis of one or more of the tire dressing machines 70, 75, and/or cambered, that is, tilted inward or outward or relative to a y-axis of the one or more of the tire dressing machines 70, 75. The system 10 can also determine the orientation of the vehicle 20 with respect to the one or more tire dressing machines 70, 75. Additionally, the first imaging device 50 may be configured to image the front and rear tires 60 of the vehicle 20 separately, thereby accommodating for different tire orientations. The measurements from the first imaging device 50 and/or the depth sensor 55 may be also detect situations in which the tire 60 is parallel or at a slight angle to the edge of the conveyor 30 but the vehicle 20 is not, thereby creating a situation in which a portion of the vehicle 20 projects beyond the edge of the tire 60 in the direction of the one or more tire dressing machines 70, 75, creating a potential collision hazard for the one or more tire dressing machines 70, 75. This situation is illustrated in FIG. 3, as discussed below.

As illustrated in FIG. 1, the system 10 may include two tire dressing machines 70, 75, one positioned on each side of the conveyor 30 (or vehicle 20 if no conveyor is present) to access the tires 60 on both sides of the vehicle 20. A second controller 80 and a depth sensor 55 or an imaging device 50, 90 may also be provided on an opposite side of the conveyor 30, if desired. Alternatively, both tire dressing machines 70, 75 may be controlled by a single controller 80, which is fed information from at least one from at least one of the imaging devices 50, 90.

Once the position and size of the imaged tire 60 is determined, a tire dressing machine, such as a first tire dressing machine 70, may be configured to apply the optimized amount of tire dressing to the imaged tire 60. Another tire dressing machine, such as a second tire dressing machine 75, may be positioned on an opposite side of the conveyor 30. The second tire dressing machine 75 may be configured to apply the optimized amount of tire dressing to the corresponding tire 60 on the other side of the vehicle 20. In some examples, the tire dressing machines 70, 75 may or may not be positioned directly opposite each other relative to the conveyor 30.

The system 10 may be a stand-alone, closed loop system. Thus, the system 10 may be used in and/or moved to a variety of different environments, such as within a tunnel car wash system, an in bay car wash, as a separate station, etc. When used in a tunnel car wash or similar system in which the vehicle is moving on a conveyor, the tire dressing system 70, 75 may be configured to calculate a speed of the belt and position of the vehicle 20 on the belt using depth imagery, time stamps on wheel or tire 60 images, and/or differences between known features on the wheel or tire 60 as measured in pixels to actual distances, based on calculations which translate measurements such as camera distances from the wheel or tire 60 and optical focal lengths to physical dimensions.

Further, a motor may be connected to a rotatable nozzle assembly, turning the nozzle to a degree to optimize spray coverage on the tire sidewall. The configuration of the system 10 is such that the tire dressing fluid is only applied to the sidewall, thereby mitigating waste and minimizing mess. The pressure of the spray is also controllable to provide variable and optimized spray coverage, as further disclosed herein.

Figure 2A:
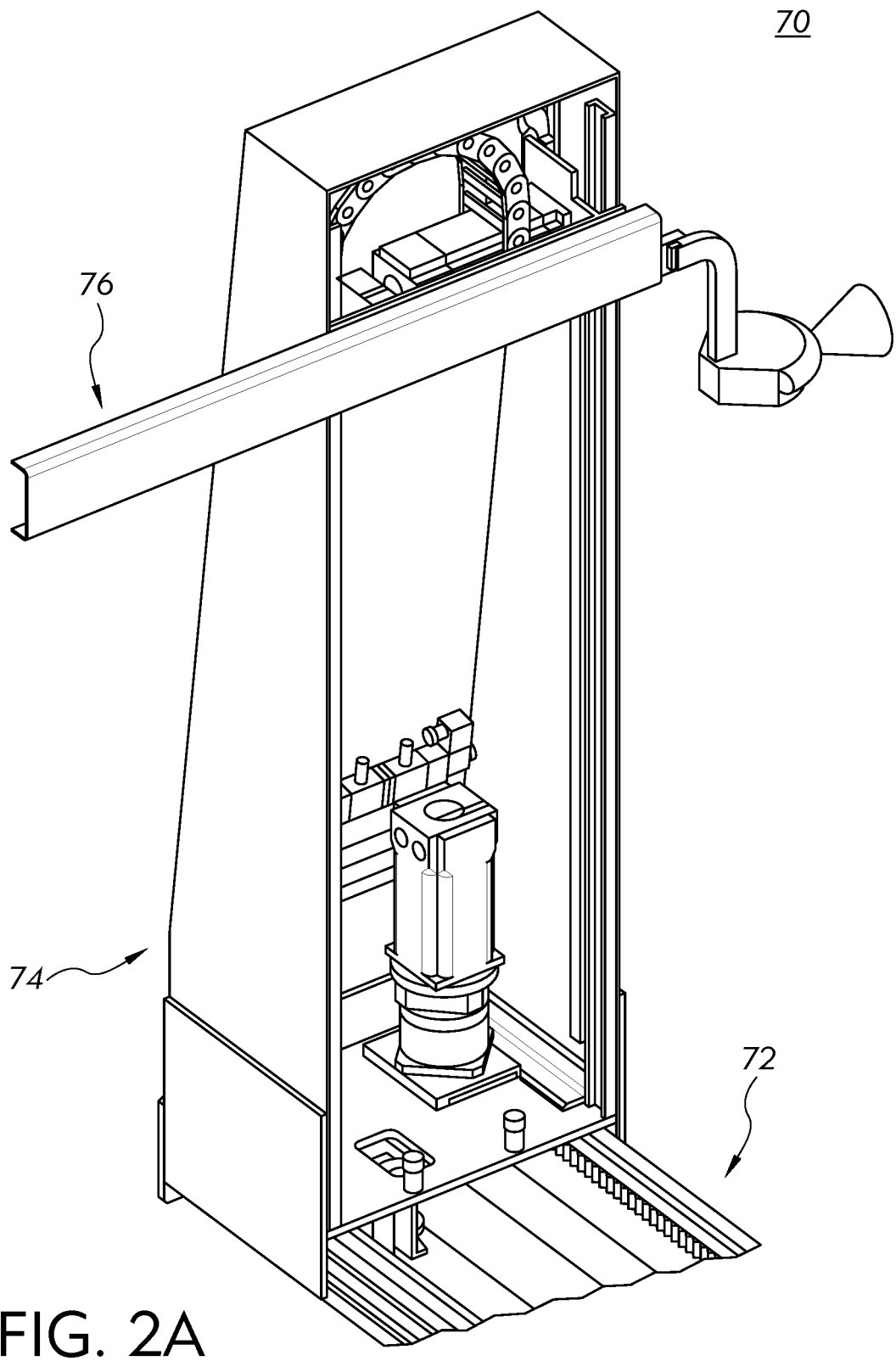
FIGS. 2A-2C illustrates a tire dressing machine according to an example embodiment.
Figure 2B:
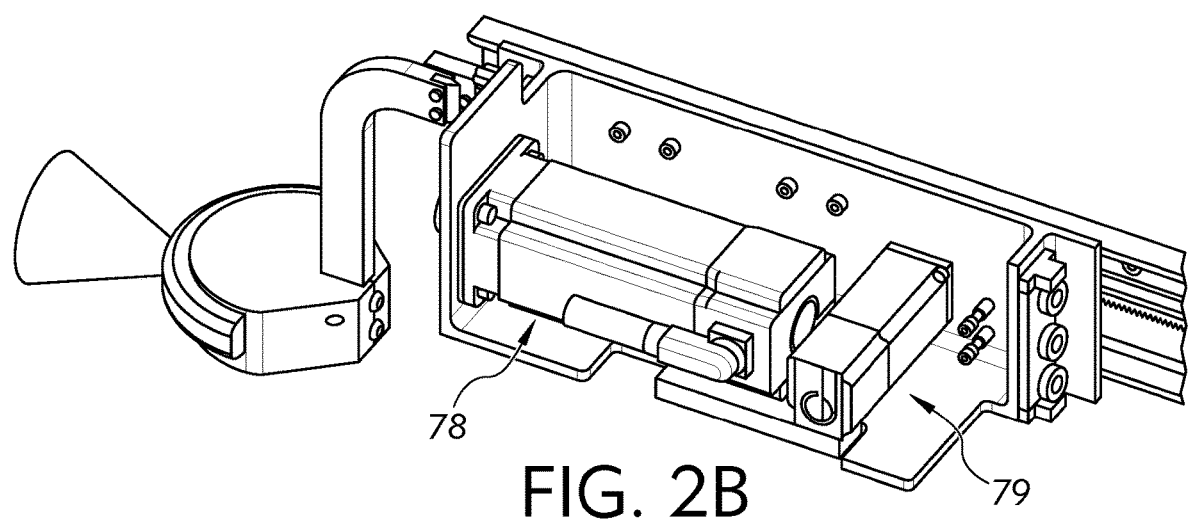
Figure 2C:
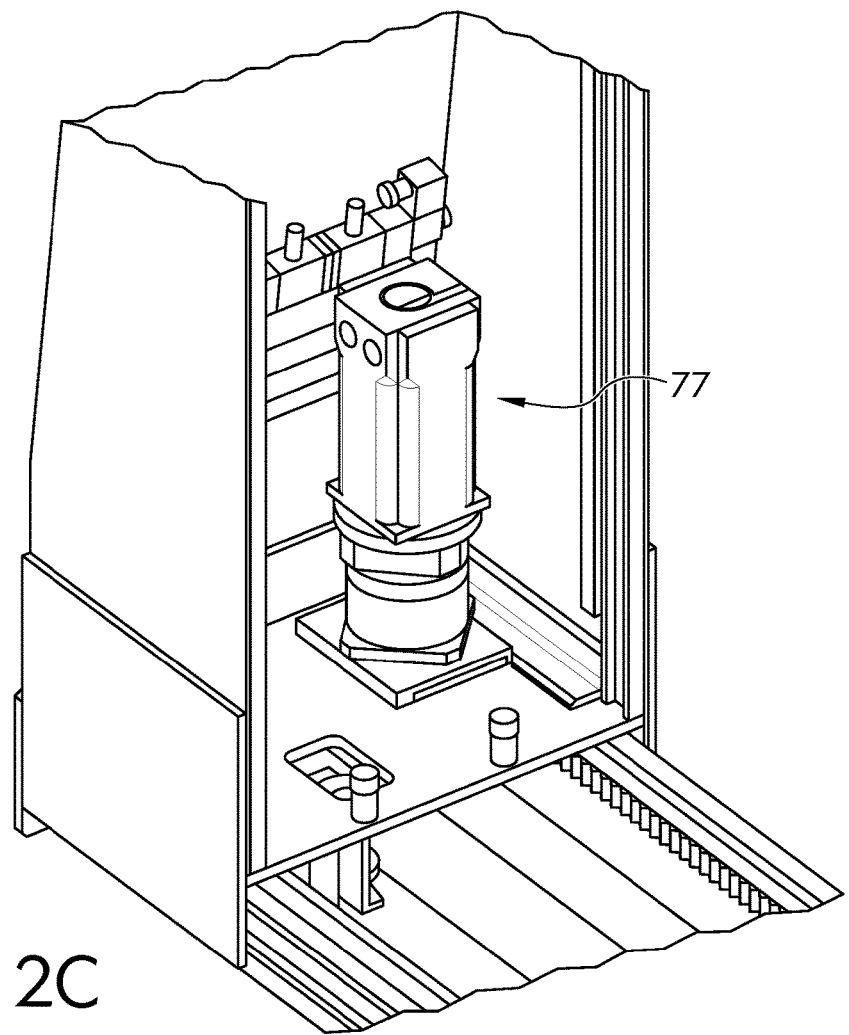

FIGS. 2A-2C illustrate a tire dressing machine according to an example embodiment. For example, the tire dressing machine may refer to any of the tire dressing machines 70, 75 as described above with respect to FIG. 1. Although FIGS. 2A-2C illustrate single instances of the components of tire dressing machine, the tire dressing machine may include any number of components. FIGS. 2A-2C may refer to or incorporate any of the elements of system 10 as described above with respect to FIG. 1.

As depicted in FIGS. 2A-2C, the tire dressing machine, such as tire dressing machine 70 and/or tire dressing machine 75 may include a longitudinal linear guide system 72 and a lateral linear guide system 74. In some examples, the longitudinal linear guide system 72 may be disposed adjacent and parallel to a conveyor, such as conveyor 30, for a vehicle 20 having a tire 60, or generally parallel to a vehicle 20 side body which may or may not be conveyed on the conveyor. The longitudinal linear guide system 72 may be coupled to a drive motor and is configured for reciprocal motion along an x-axis. The longitudinal linear guide system 72 may be operably connected to the controller 80.

The lateral linear guide system 74 may be mounted upon and transverse to the longitudinal linear guide system 72. The lateral linear guide system 74 may include a shuttle mounted thereon and is configured for linear reciprocal motion along a y-axis. In some examples, a vertical y-axis rail may be positioned downstream and one may be positioned upstream. The shuttle may include a movable arm assembly with a motor mounted thereon. The movable arm assembly may be operable to move to various positions corresponding with a dimension of the tire 60 and to elevate an applicator head about the tire 60.

As further depicted in these figures, coupled to the lateral linear guide system 74 is a z-axis rail 76. The z-axis rail 76 may comprise a non-telescoping rail or a telescoping rail, which allows for a predetermined amount of reach towards a vehicle 20, including but not limited to 30 inches, and retraction, to fully retract a tire dressing applicator from the vehicle 20 and conveyor 30. By allowing for movement of the applicator in each of the x, y, and z directions, the tire dressing machine 70, 75 may be configured to accommodate a tire 60 or vehicle 20 position that is angled with respect to an edge of the conveyor 30; or in other words, a position in which a vertical plane of the vehicle 20 and/or tire 60 is not parallel with a predetermined vertical plane, which may be defined by an edge of the conveyor 30 or with the longitudinal linear guide system 72. In some examples, FIGS. 2B-2C illustrate a plurality of motors (which may be relative to linear guide system 74 and z-axis rail 76), such as a horizontal axis motor 77, a vertical axis motor 78, and a z axis rail motor 79.

In some examples, the controller 80 may be configured to control a motion profile of each of the tire dressing machines 70, 75 so they operate together at the same speed, same instruction, and same motion. For example, a motion profile for each of the operations of the first and second tire dressing machines 70, 75 may be synchronously coordinated or mirrored by the controller.

FIG. 3 illustrates a schematic of a vehicle positioned relative to a conveyor according to an example embodiment. FIG. 3 may refer to or incorporate any of the elements of system 10 as described above with respect to FIG. 1 and FIGS. 2A-2C (hereafter "FIG. 2"). For example, a vehicle, such as vehicle 20, may be positioned off-centered and also unparallel relative to a conveyor, such as conveyor 30. The tires, such as front tires 60 of the vehicle 20, may be unparallel to an edge of the vehicle 20 but parallel to an edge of the conveyor 30. As a consequence of such positioning of the vehicle 20 and tires 60 relative to the conveyor 30, this yields a situation in which a portion of the vehicle 20 projects beyond the edge of the tire 60 in the direction of one or more tire dressing machines 70, 75 (not shown), creating a potential collision hazard, denoted 62, for the one or more tire dressing machines 70, 75.

FIGS. 4A-4L illustrate various vehicle and tire configurations that can be encountered on a conveyor for the system, such as system 10, according to an example embodiment. FIGS. 4A-4L may refer to or incorporate any of the elements of system 10 as described above with respect to FIG. 1 and FIG. 2 and FIG. 3. By using each of the x, y, and z rails, tire shine fluid may be sprayed accurately and evenly around the sidewalls of the tires 60 in each of the situations depicted in these figures. The system 10 may also be configured to accommodate spraying on a tire 60 which is stationary, but which may not be parallel to the longitudinal linear guide rail (x-axis). As further depicted in FIGS. 4A-4L, the system 10 may be configured to manage and account for variability in: vehicle position relative to the belt or conveyor 30 (for example, the vehicle 20 being centered or off-centered); angle of the tire 60 relative to the vehicle 20 (for example, wheels parallel to the vehicle 20, front wheels angled, front and rear wheels angled); and angle of the vehicle 20 relative to the belt or conveyor 30 (for example, vehicle 20 parallel to the conveyor 30 or vehicle 20 unparallel to the conveyor 30). For purposes of brevity, the vehicle, tire, and conveyor may refer to the respective vehicle 20, tire 60, and conveyor 30 as explained above regarding FIG. 3.

Figure 4A:
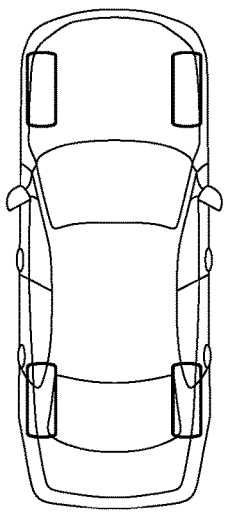
FIGS. 4A-4L illustrate various vehicle and tire configurations that can be encountered on a conveyor for the tire dressing application system according to an example embodiment.
Figure 4B:
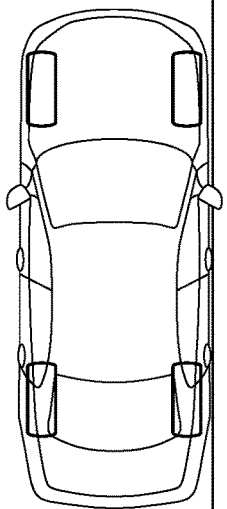
Figure 4C:
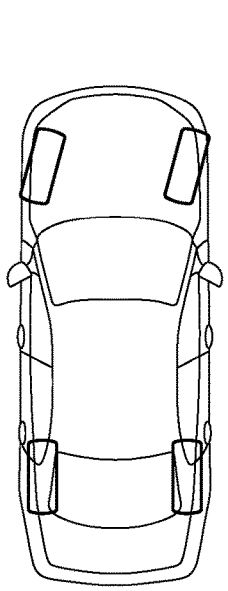
Figure 4D:
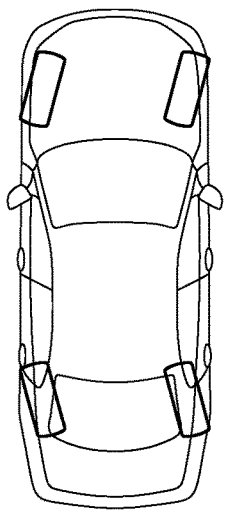
Figure 4E:
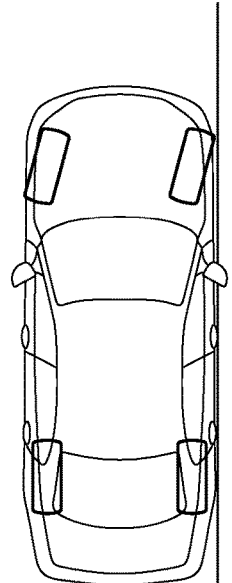
Figure 4F:
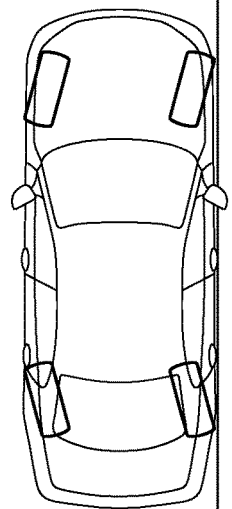
Figure 4H:
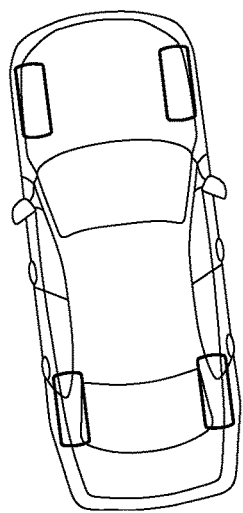
Figure 4J:
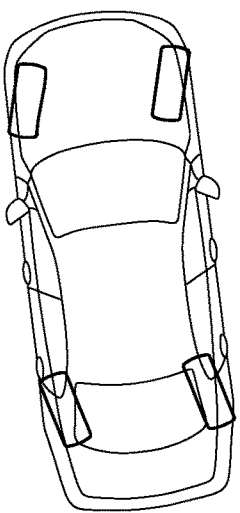
Figure 4L:
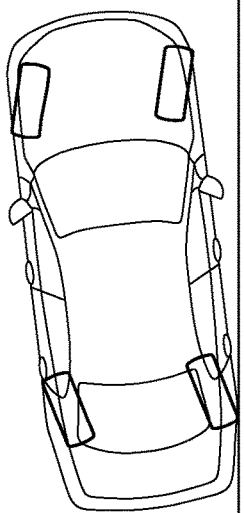
Figure 4G:
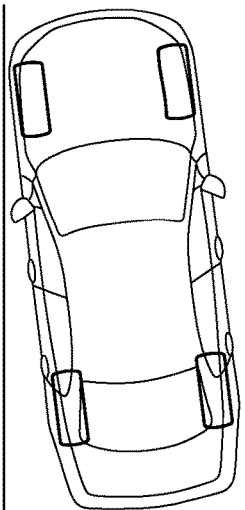
Figure 4I:
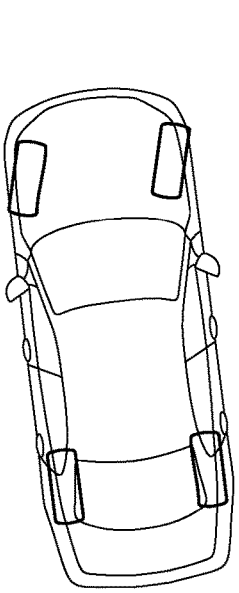
Figure 4K:
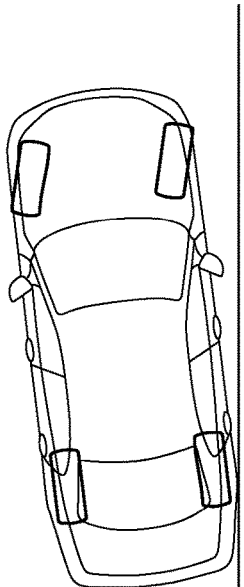

In particular, FIG. 4A depicts a vehicle that is centered and parallel relative to the conveyor, in which its tires are also parallel. FIG. 4B depicts a vehicle that is off-centered but parallel relative to the conveyor, in which its tires are also parallel. FIG. 4C depicts a vehicle that is centered and parallel relative to the conveyor, in which the front tires are unparallel. FIG. 4D depicts a vehicle that is centered and parallel to the conveyor, in which all tires are unparallel. FIG. 4E depicts a vehicle that is off-centered and parallel relative to the conveyor, in which front tires are unparallel. FIG. 4F depicts a vehicle in which the vehicle is off-centered and parallel relative to the conveyor, in which all the tires are unparallel. FIG. 4G depicts a vehicle that is centered and unparallel relative to the conveyor, in which the tires are parallel. FIG. 4H depicts a vehicle that is off-centered and unparallel relative to the conveyor, in which the tires are parallel. FIG. 4I depicts a vehicle that is centered and unparallel relative to the conveyor, in which the front tires are unparallel. FIG. 4J depicts a vehicle that is centered and parallel relative to the conveyor, in which all tires are unparallel. FIG. 4K depicts a vehicle that is off-centered and unparallel relative to the conveyor, in which the front tires are unparallel. FIG. 4L depicts a vehicle that is centered and parallel relative to the conveyor, in which all tires are unparallel.

FIGS. 5A-5H illustrate various stages of operations and positioning of a tire dressing machine according to an example embodiment. FIGS. 5A-5H may refer to or incorporate any of the elements of system 10 as described above with respect to FIG. 1 and FIG. 2 and FIG. 3 and FIGS. 4A-4L.

Figure 5A:
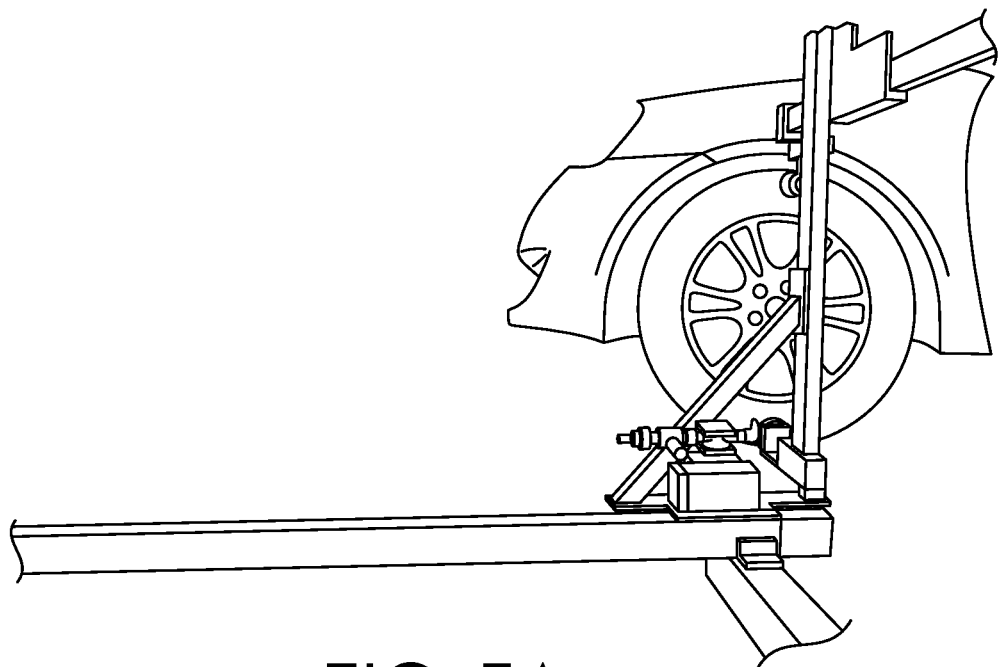
FIGS. 5A-5H illustrate various stages of operations and positioning of a tire dressing machine according to an example embodiment.
Figure 5B:
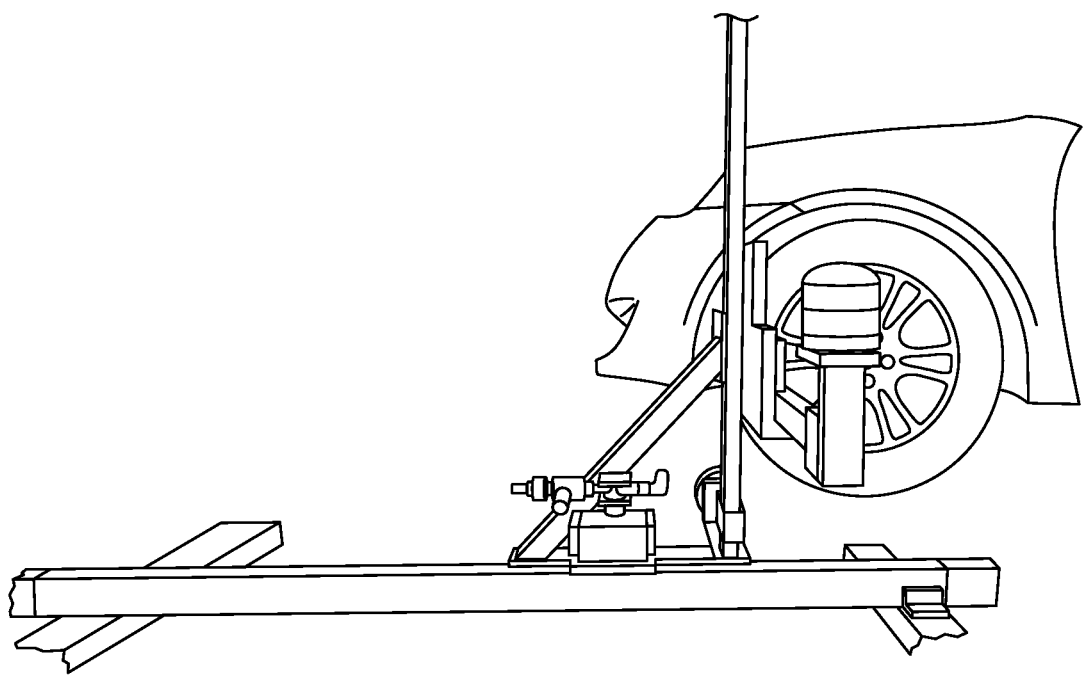
Figure 5C:
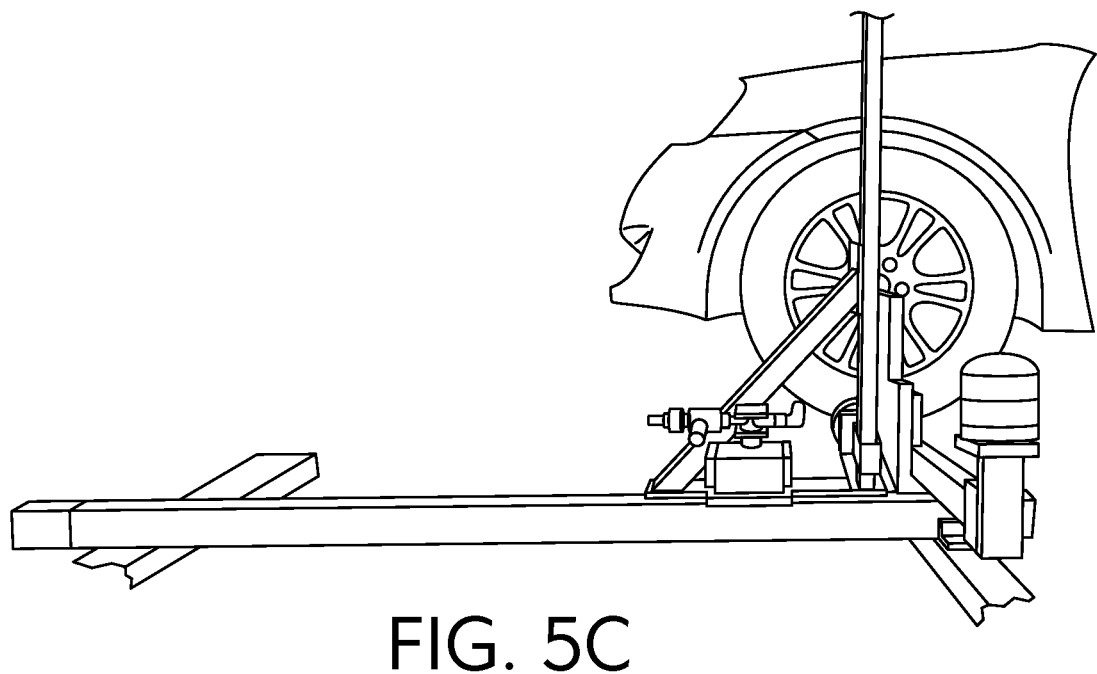
Figure 5D:
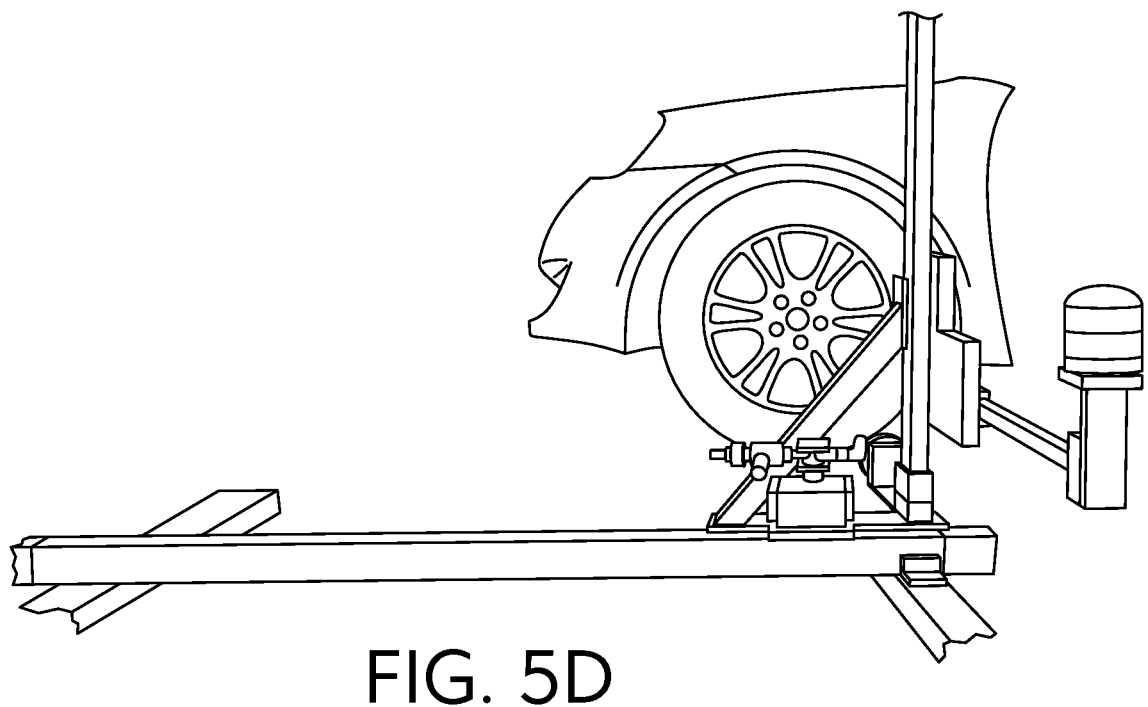
Figure 5E:
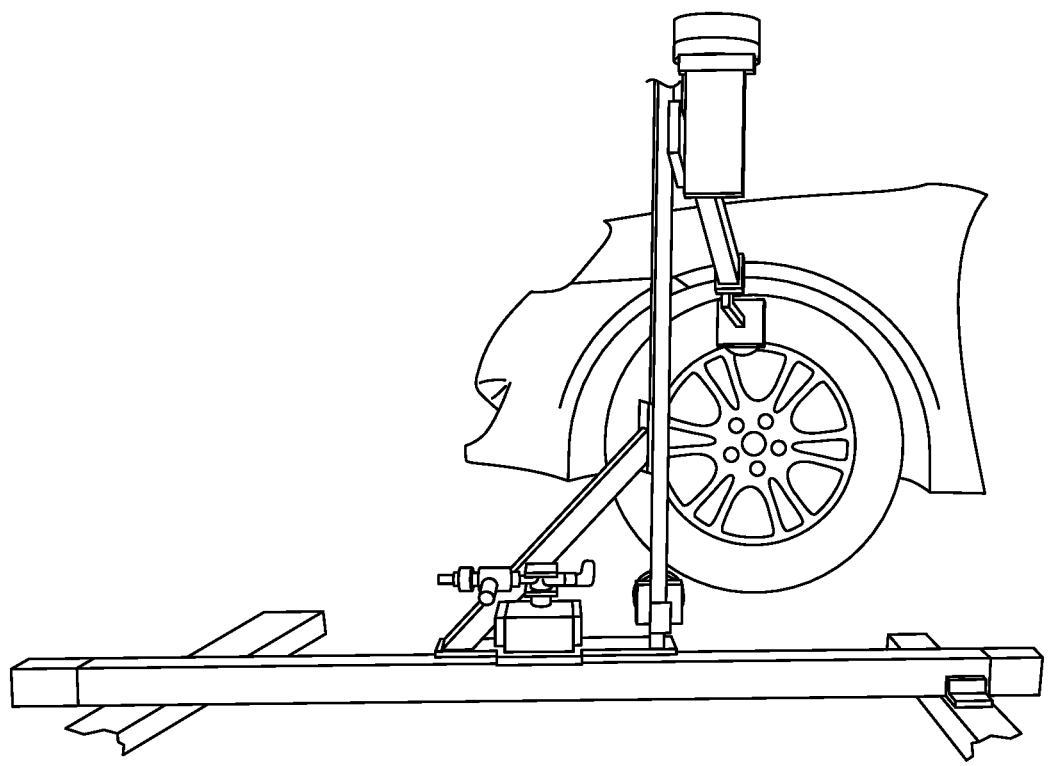
Figure 5F:
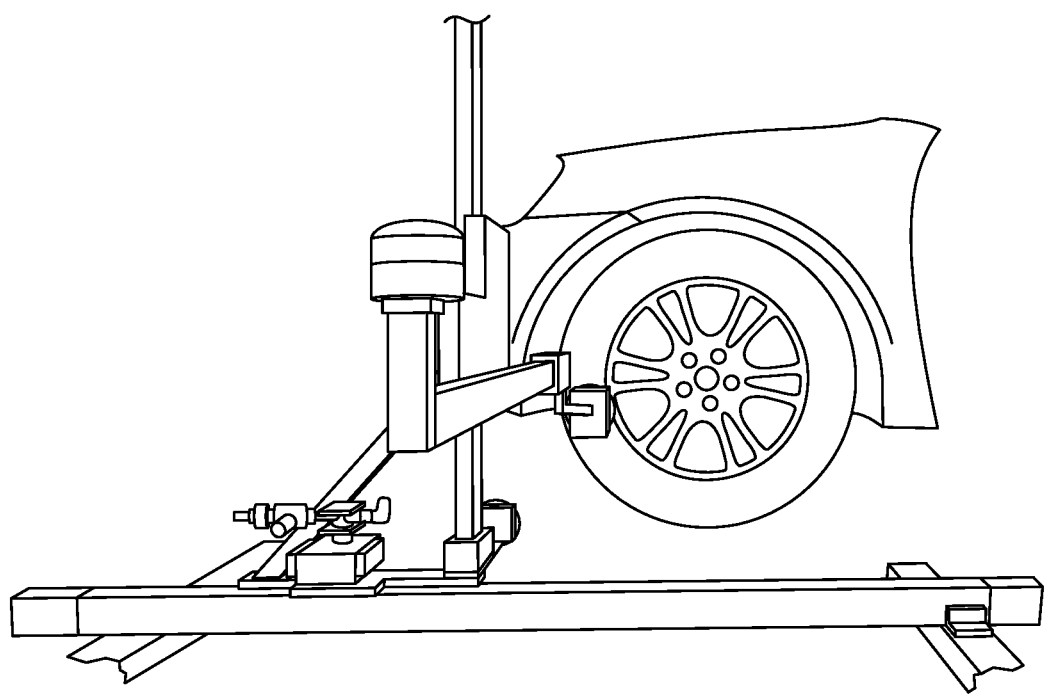
Figure 5G:
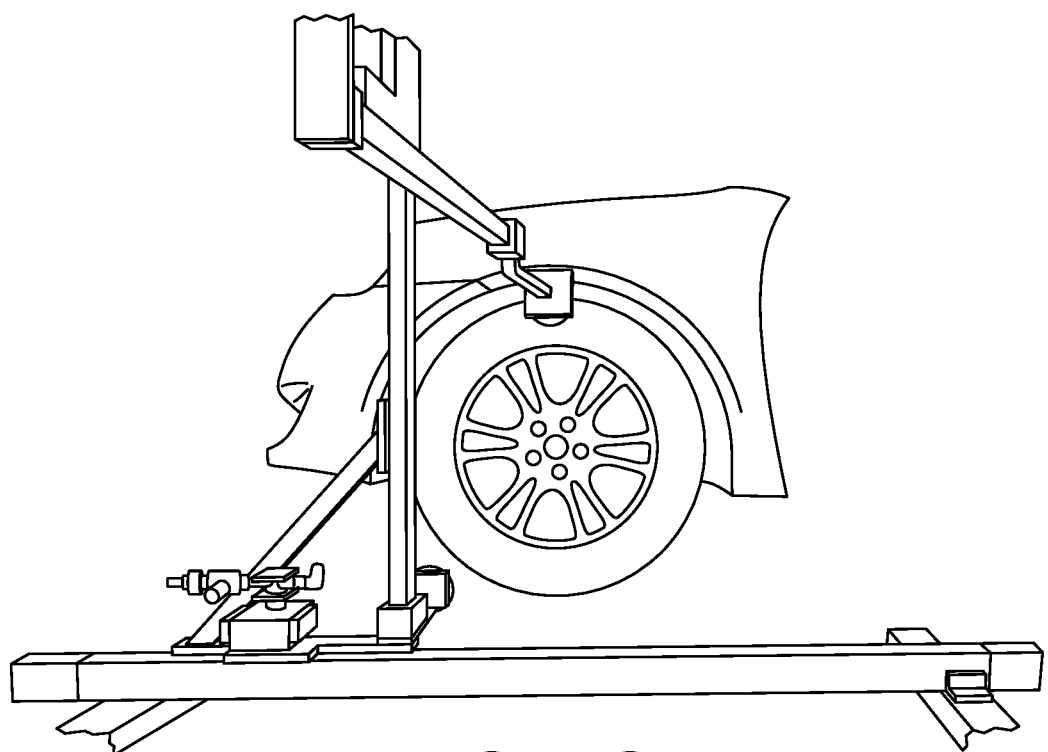
Figure 5H:
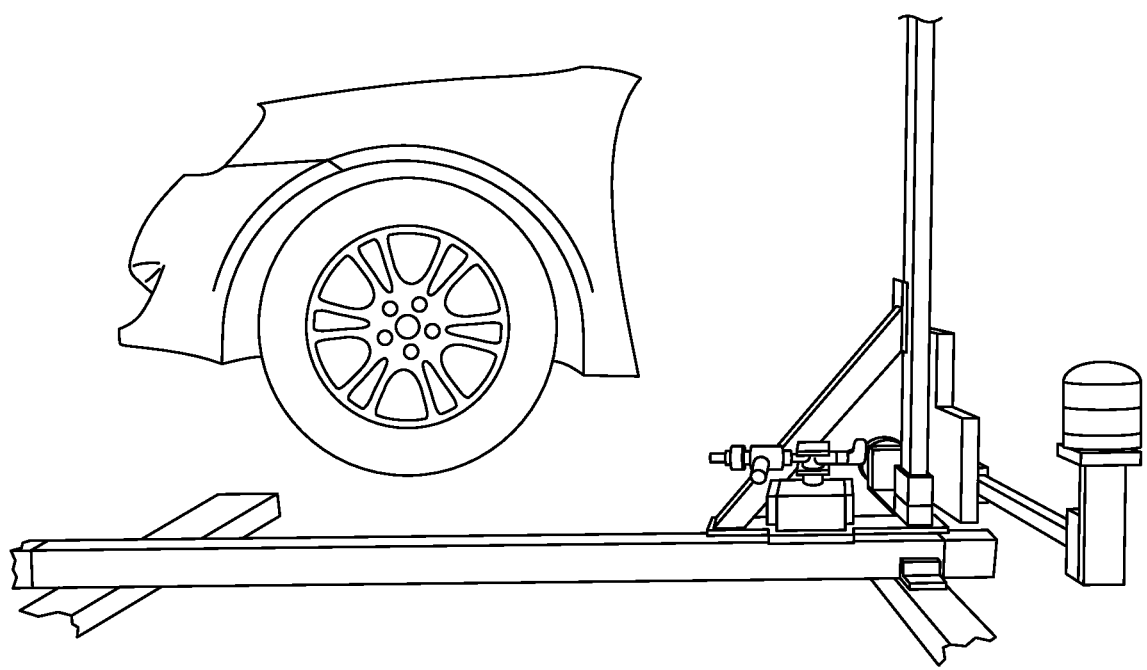

In particular, FIG. 5A illustrates a first stage of operation of a tire dressing machine, such as tire dressing machine 70, 75 at a first position. A vehicle, such as vehicle 20, may begin a process for the application of the tire dressing. FIG. 5B illustrates a second stage of operation of the tire dressing machine at a second position. The vehicle may continue its progression for the application of the tire dressing. FIG. 5C illustrates a third stage of operation of the tire dressing machine at a third position. The vehicle may continue its progression for the application of the tire dressing. FIG. 5D illustrates a fourth stage of operation of the tire dressing machine at a fourth position. The vehicle may continue its progression for the application of the tire dressing. FIG. 5E illustrates a fifth stage of operation of the tire dressing machine at a fifth position. The vehicle may continue its progression for the application of the tire dressing. FIG. 5F illustrates a sixth stage of operation of the tire dressing machine at a sixth position. The vehicle may continue its progression for the application of the tire dressing. FIG. 5G illustrates a seventh stage of operation of the tire dressing machine at a seventh position. The vehicle may continue its progression for the application of the tire dressing. FIG. 5H illustrates an eight stage of operation of the tire dressing machine at an eighth position. The vehicle may continue its progression for the application of the tire dressing. It is understood that a tire 60 of a vehicle 20 need not follow this sequence of progression. Moreover, at any stage, such as the fifth stage, an applicator for applying the tire dressing may follow after the tire 60 has been identified and aligned, as previously described.

Figure 6:
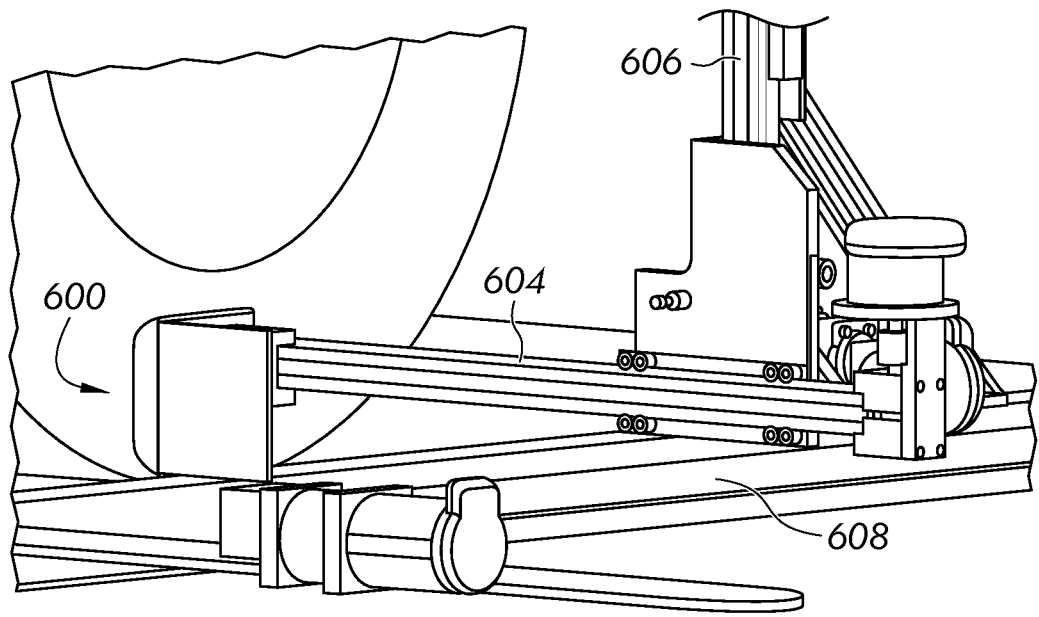
FIG. 6 illustrates an end effector according to an example embodiment.

FIG. 6 illustrates an end effector according to an example embodiment. FIG. 6 may refer to or incorporate any of the elements of system 10 as described above with respect to FIG. 1 and FIG. 2 and FIG. 3 and FIGS. 4A-4L and FIGS. 5A-5H.

In some examples, an end effector 600 may be used as an applicator, such as a tire dressing applicator. The end effector 600 may be coupled to a z-axis rail 604 relative to a y-axis rail 606 and an x-axis rail 608, as depicted in FIG. 6.

Figure 7:
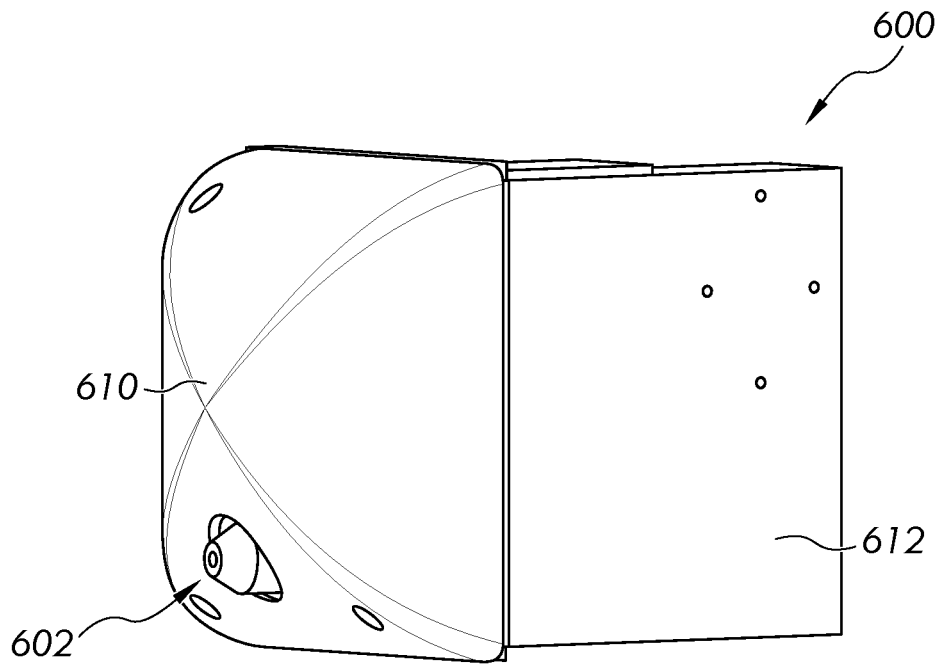
FIG. 7 illustrates an end effector according to an example embodiment.

FIG. 7 illustrates an end effector according to an example embodiment. FIG. 7 may refer to or incorporate any of the elements of system 10 as described above with respect to FIG. 1 and FIG. 2 and FIG. 3 and FIGS. 4A-4L and FIGS. 5A-5H and FIG. 6.

The end effector 600 may include a nozzle 602. The nozzle 602 may be configured to spray a mist of tire dressing onto the sidewall of the tire 60. The end effector 600 and nozzle 602 may be coupled to the z-axis rail 604, either individually or as an assembly, and may be of any suitable shape. In some examples, the nozzle 602 may be cone-shaped, which mitigates the need for the nozzle 602 to be rotated. However, any suitable nozzle 602 may be used. Additionally, air may be added to the tire shine material at the point of the nozzle 602 or upstream to aid in atomization of the mist. The end effector 600 may include a convex or similar shaped housing 610, which creates a crush zone configured to absorb shock upon inadvertent impact of the housing 610 with an object and minimize shock transferred to the tire dressing machine 70, 75. The housing 610 may include an opening aligned with an opening of the nozzle 602 for spraying the tire dressing. In some examples, the nozzle 602 may be attached to a lightweight end having a cone-shaped, elliptic conical, or frustoconical housing 610. As shown in FIG. 7, the nozzle 602 may be recessed from the forwardmost portion of the end effector 600. Thus, in the event of an inadvertent impact, the nozzle 602 may be protected from impact by the housing 610. Further, the end effector 600 may include a flange 612, such as a connection portion that may extend from the convex portion of the housing 610 for connection to the z-axis rail 604.

In some examples, the end effector 600 may comprise a bar that includes a plurality of nozzles 602 connected thereto. The plurality of nozzles 602 may include any number of nozzles. The system 10 may be configured to control the end effector 600 and its movement in a plurality of axes, such as y- and z-axes, to cover one or more sidewalls of the tire 60. For example, when the x-axis is stationary, the system 10 may be configured to selectively operate, such as turn on and/or off, each of the plurality of nozzles 602 to cover the one or more sidewalls of the tire 60 for spraying the tire dressing. In this manner, the system 10 may be configured to "handoff" spraying the tire dressing to a different nozzle 602 of the plurality of nozzles 602 so as to eliminate acceleration and/or deceleration challenges posed by the x-direction.

Figure 8:
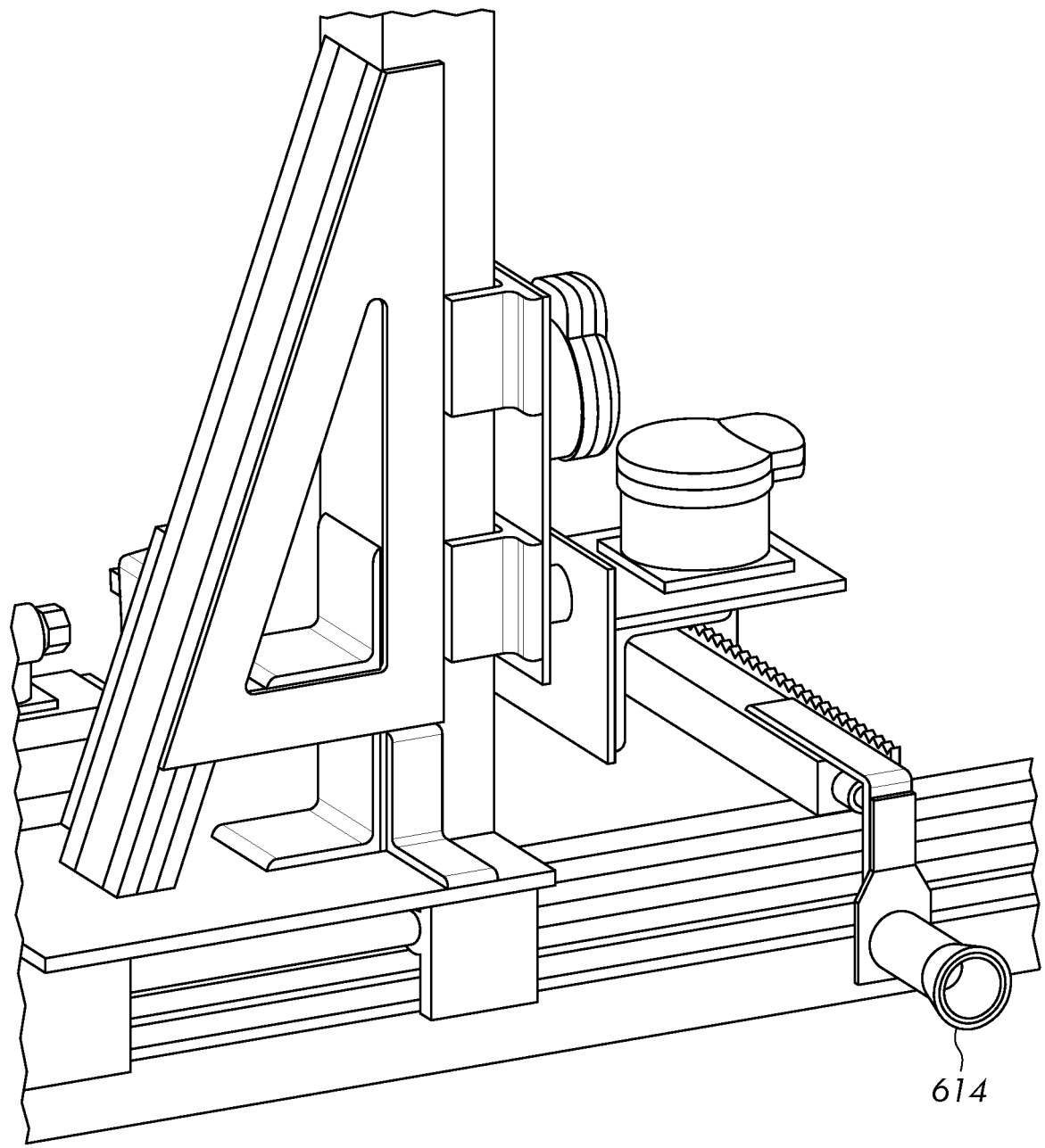
FIGS. 8-10 illustrate a tube according to an example embodiment.
Figure 9:
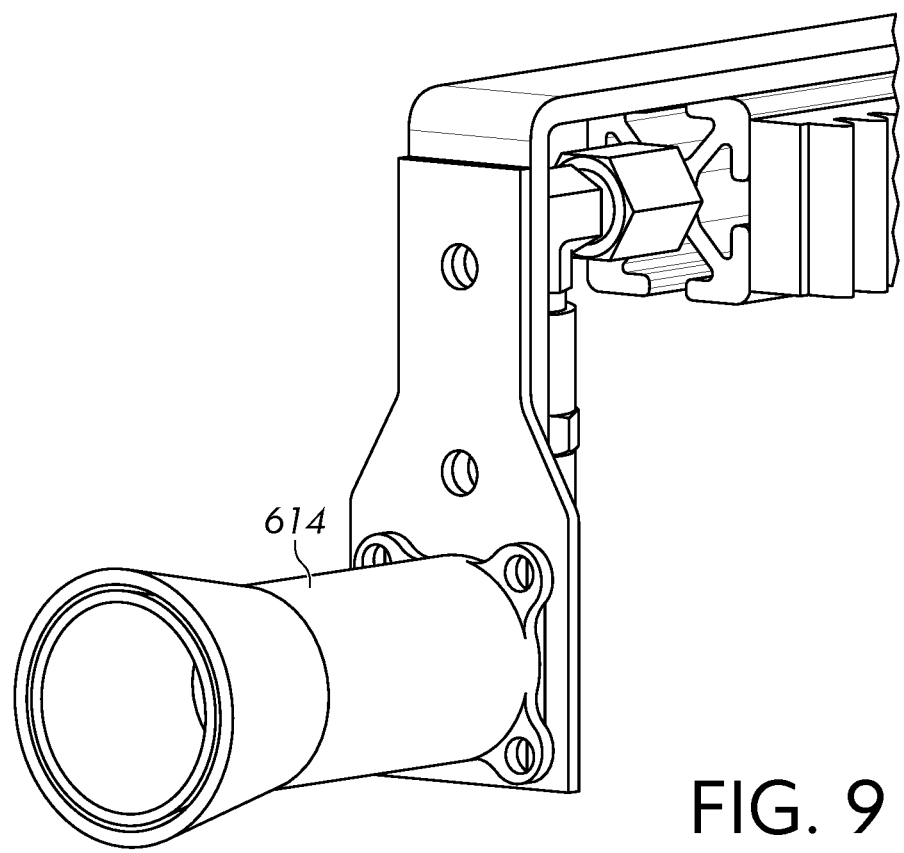
Figure 10:
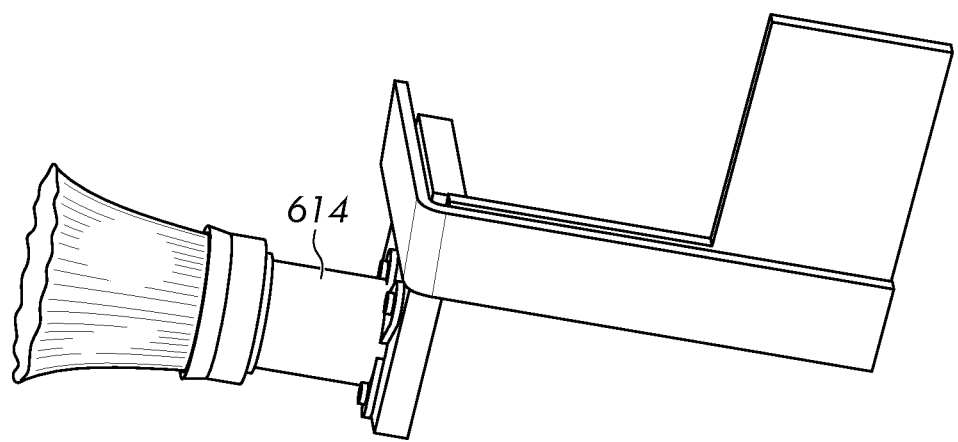

FIGS. 8-10 illustrate a tube according to an example embodiment. FIGS. 8, 9, and 10 may refer to or incorporate any of the elements of system 10 as described above with respect to FIG. 1 and FIG. 2 and FIG. 3 and FIGS. 4A-4L and FIGS. 5A-5H and FIG. 6 and FIG. 7. As shown in FIGS. 8, 9, and 10, the end effector 600 may include a tube 614 configured to convey the sprayed mist while preventing, reducing, and/or blocking turbulent flow from other operations in the car wash which may interfere with a trajectory of the tire shine mist. As an example, the tube 614 may be about 5 inches in length with or without flexible bristles attached to an end, as shown in FIG. 10. In each of FIGS. 8, 9, and 10, the end effector 600 may be configured to mitigate damage to the vehicle 20 in the event of an inadvertent collision. The nozzle 602 may include a press-fit, magnetic, or other no-fastener approach to the z-axis 604. Thus, if the end effector 600 is bumped by an object, such as a worker or a vehicle 20, it can break away from the end effector 600 without causing damage to the object, such as the vehicle 20. It is to be appreciated that any suitable breakaway connection can be provided to allow for the end effector 600 to both attach and detach easily. Additionally, such configuration allows for the end effector 600 to be attached and reattached without the use of tools. Moreover, the end effector 600 may be made of a soft and/or conformable material that is non-marking and non-scratching. Thus, the stiffness of the end effector 600 may be considered for its design to avoid scratching or damaging any equipment. Further, the end effector 600 may be configured to include a crush zone, thereby providing built-in safety features that mitigate damage to vehicle 20. Still further, the end effector 600 may be configured to use materials which are disposable or recyclable, including but not limited to as paper, cardboard, foamed polymer, rigid polymer, flexible polymer, elastomer/rubber, TPE, TPV, TPU, and the like, thereby facilitating a use in which the end effector 600 will not need to be cleaned or maintained, but rather disposable and discarded and replaced if it becomes fouled or damaged. One or more sensors can be coupled to the end effector 600 to prevent a collision and/or to instruct the tire dressing machine(s) 70, 75 to retract, such as via the z-axis, if a collision is detected. The sensor(s) can be one or more of a proximity sensor, tape sensor, pressure sensor, or the like, and/or any combination thereof.

Figure 11:
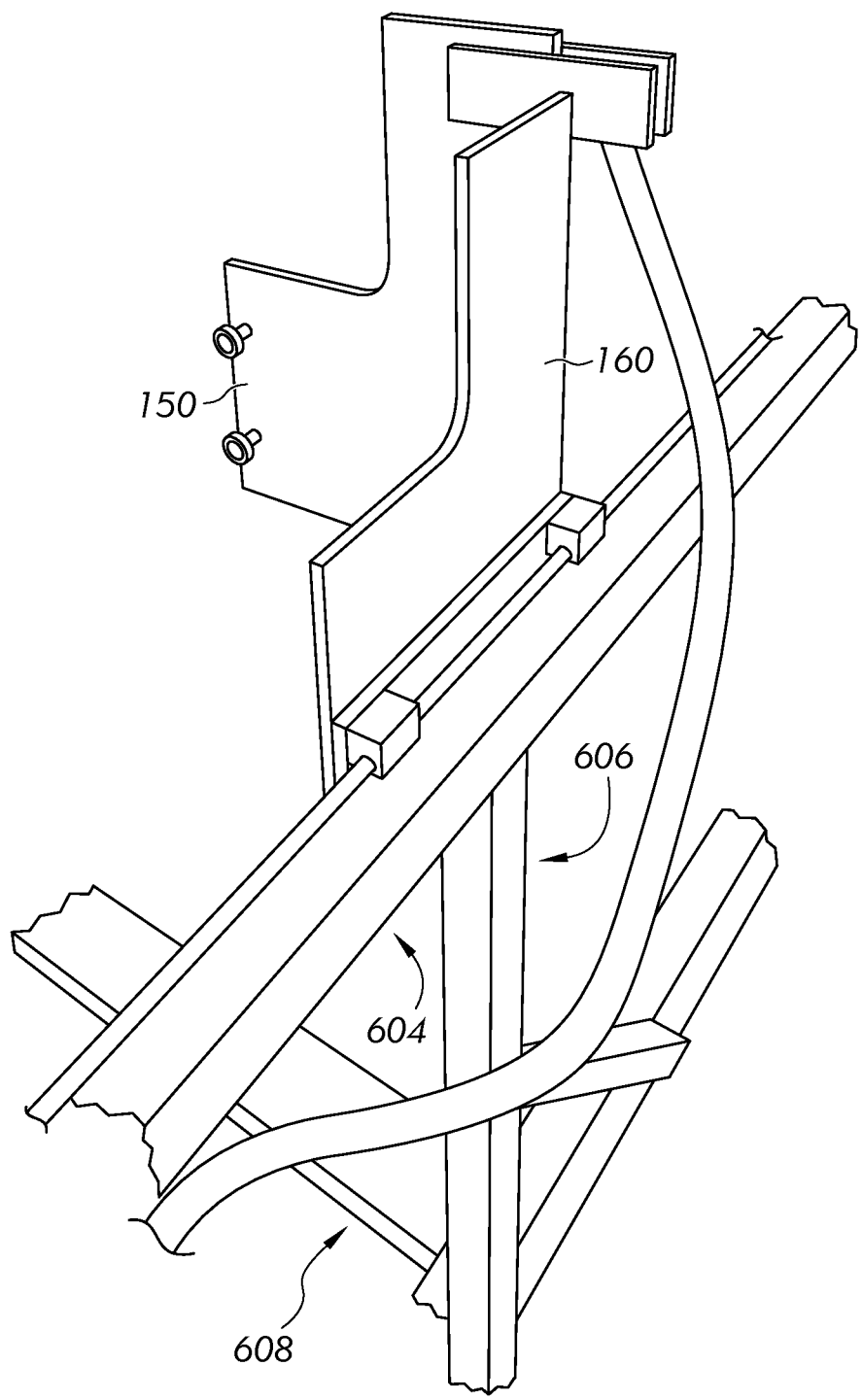
FIG. 11 illustrates various axis rails according to an example embodiment.

FIG. 11 illustrates various axis rails according to an example embodiment. FIG. 11 may refer to or incorporate any of the elements of system 10 as described above with respect to FIG. 1 and FIG. 2 and FIG. 3 and FIGS. 4A-4L and FIGS. 5A-5H and FIG. 6 and FIG. 7 and FIG. 8 and FIG. 9 and FIG. 10.

For example, the various axis rails may include a z-axis rail 604, a y-axis rail 606, and an x-axis rail 608. A breakaway feature, such as a panel, may be provided between the y-axis rail 606 and the z-axis rail 604. For example, the breakaway feature can include a first section 150 and a second section 160. The first section 150 may be coupled to the y-axis rail 606. The second section 160 may be coupled to the z-axis rail 604. The first section 150 may be positioned in parallel with respect to the second section 160 and may be coupled together via a spring mechanism or the like. Thus, should the z-axis rail 604 become extended so far such that it makes contact with a moving vehicle 20, a spring-loaded, hinged arm will allow the second section 160, held closed with magnets or another type of latch, to pivot away from the vehicle 20, and away from the first section 150 when some minimal force is applied before causing damage to the vehicle 20. The design of the breakaway feature allows for the system 10 to be quickly and easily reset by moving the arm back into position and latched, with no need for tools.

FIGS. 12-17 illustrate various features of a distribution system according to an example embodiment. FIGS. 12-17 may refer to or incorporate any of the elements of system 10 as described above with respect to FIG. 1 and FIG. 2 and FIG. 3 and FIGS. 4A-4L and FIGS. 5A-5H and FIG. 6 and FIG. 7 and FIG. 8 and FIG. 9 and FIG. 10 and FIG. 11.

In some examples, the distribution system may be configured to deliver tire dressing fluid to a tire dressing system, as described above. The distribution system may include a tank, such as pressure tank, which contains the tire dressing fluid. The pressure tank may be any pressure-resistant container, such as a steel drum, a fiber-reinforced tank, or any number of plastic vessels which allow contents to be pressurized. The pressure tank can be a vertical or horizontal air over water pressure tank. A pressure source, such as a pump or compressor, is coupled to the tank such that the tire dressing fluid therein can be pressurized to a predetermined pressure, such as between 30 and 150 psi.

Figures 12, 13:
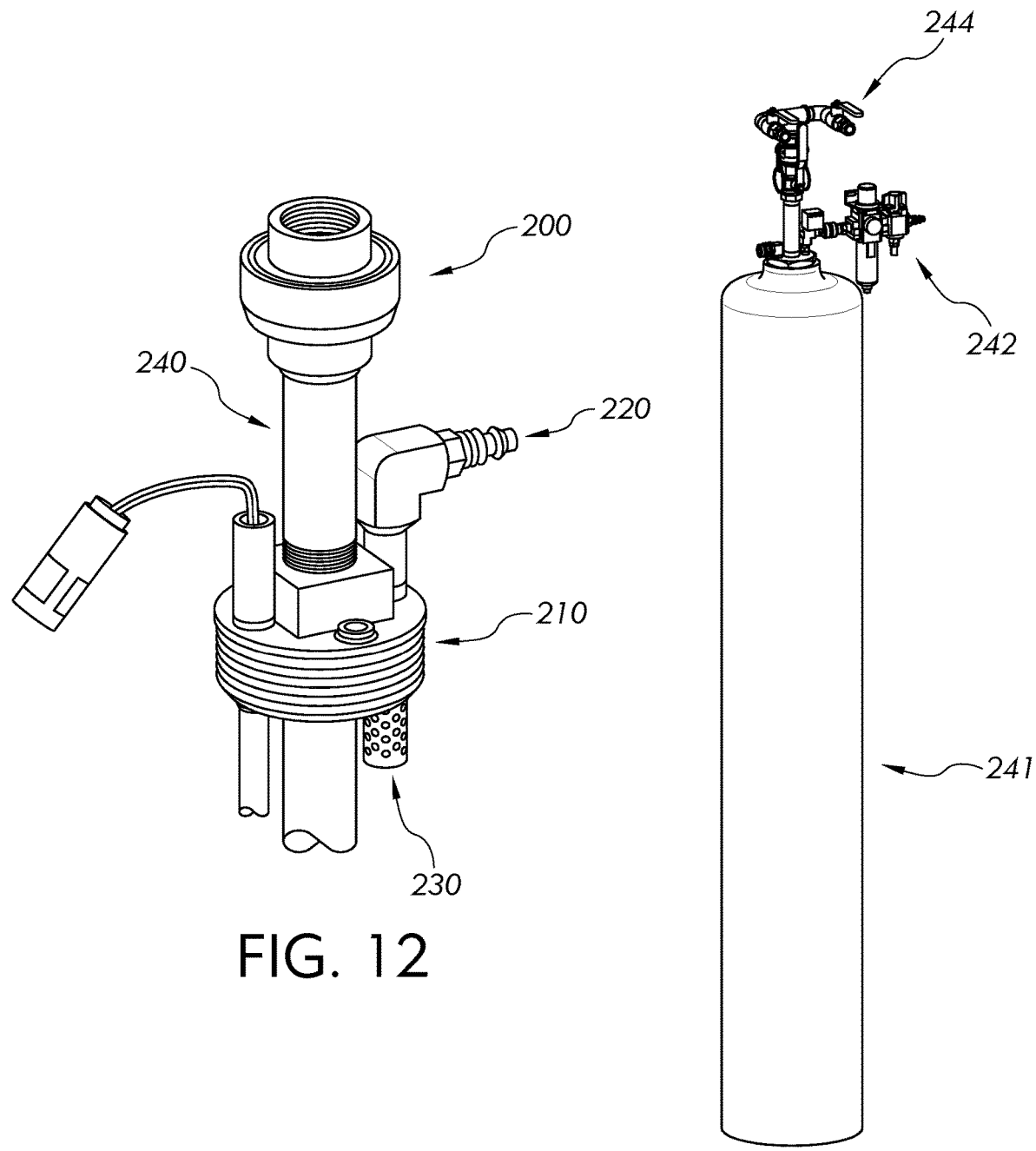

As illustrated in FIG. 12, to connect the pressure source with the tank 241, a pressure tank fitting 200 may be secured to the pressure tank. Referring briefly to FIG. 13, a tank 241, such as the pressure tank, is illustrated, and may be coupled to an inlet 242, and an outlet 244. In some examples, the inlet 242 may comprise an air inlet that is coupled to the tank 241. In some examples, the outlet 244 may comprise a tire dressing fluid outlet that is coupled to the tank 241. The pressure tank fitting 200 may include a cap component 210, which is threaded at its outer diameter to mate with and seal an opening of the tank 241. Extending through the cap component 210 is a pressure fitting 220 that extends from a top portion of the tank 241 for connection to the pressure source via tubing or the like. Extending into the tank 241, the pressure fitting 220 includes an air port 230 with one or more apertures configured to deliver pressurized air into the tank 241 and place the fluid therein under pressure.

Figure 14:
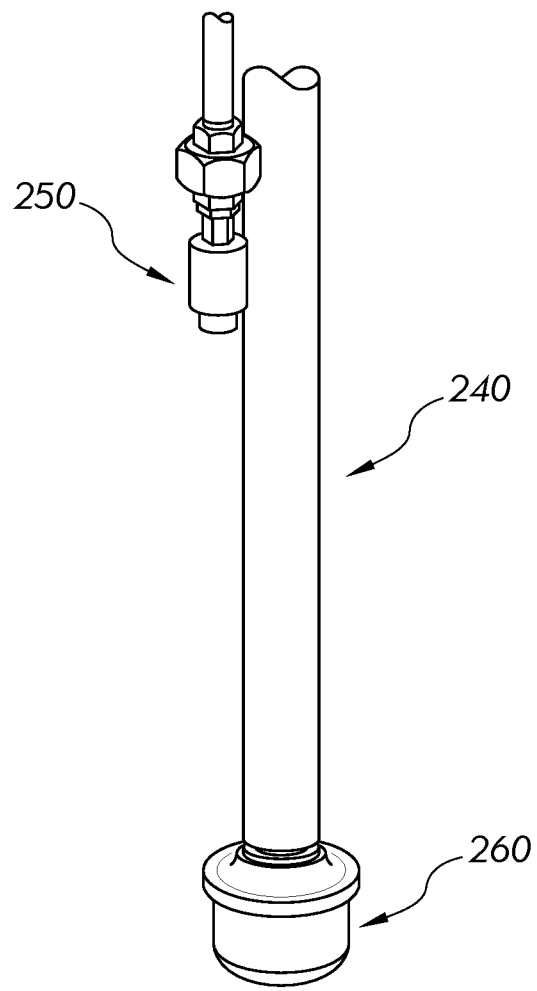

The tire dressing fluid under pressure is then conveyed upwards through a vertically extending tube 240 in the tank 241, as further depicted in FIG. 12. The tube 240 may include a first end positioned within and adjacent a bottom portion of the tank and a second end outside of the tank. The first end of the tube 240 may be connected to a filter or mesh sump 260, as illustrated in FIG. 14, to mitigate particles, foreign objects, or any obstructions from entering the tube 240. The second end of the tube 240 may be connected to a nozzle through a manifold and series of valves which prevent leakage and allow for the addition of air to the tank 241. The tank 241 may also be fitted with one or more sensors, such as level sensor 250, that are configured detect a fluid level and alert operators when the tank 241 is in need of refilling, as shown in FIG. 14.

Figure 15:
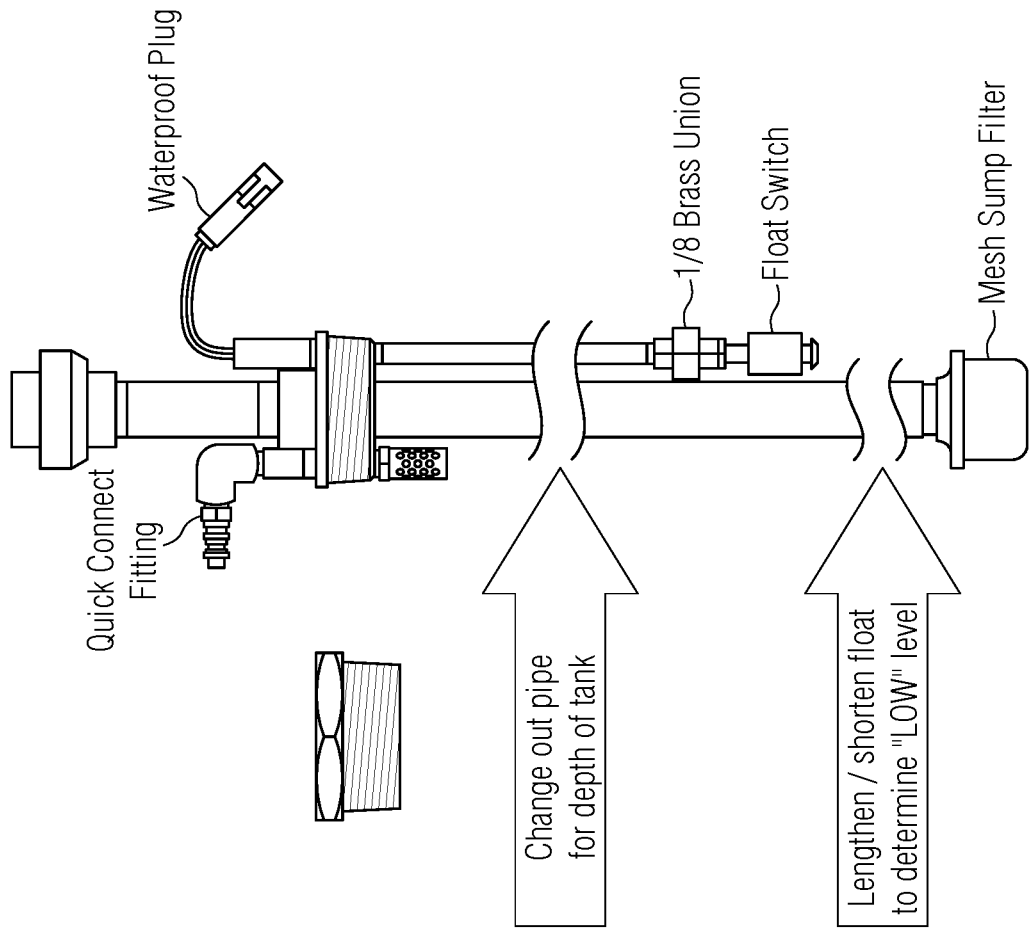

FIG. 15 illustrates components of the distribution system according to an example embodiment. FIG. 15 may refer to or incorporate any of the elements of system 10 as described with respect to FIGS. 1-14. For example, these components may include a quick connect fitting, a waterproof plug, ⅛ brass union, a float switch, and mesh sump filter.

Figure 16:
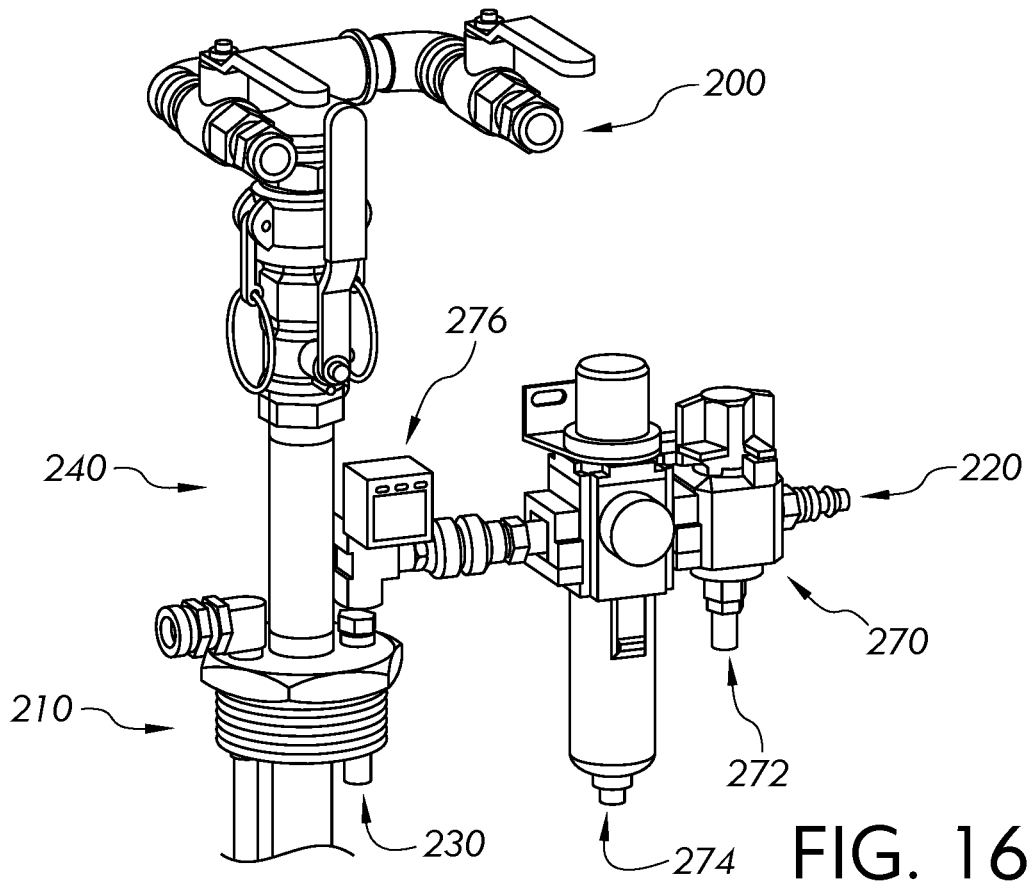

FIG. 16 illustrates additional components that may be included in the distribution system according to an example embodiment. FIG. 16 may refer to or incorporate any of the elements of system 10 as described with respect to FIGS. 1-15. For example, the pressure tank fitting 200 may include one or more selected from the group of an emergency air shutoff valve 270, a silencer for air bleed 272, a regulator with filter 274, and an electronic pressure sensor 276. The pressure tank fitting 200 may include a cap component 210 and an air port 230. Extending through the cap component 210 is a pressure fitting 220. The tire dressing fluid under pressure may be conveyed upwards through a tube, such as tube 240. By using an emergency shutoff pressure valve 270, the system can bleed air from the tank for refilling without the need to disconnect the hose. This may also allow for hard plumbing to the system. The pressure regulator 274 may be provided at the fitting shut off and may be fixed or variable. A pressure sender can send the pressure information to the system so a proper or desired pressure can be verified.

Alternatively, or additionally, an air line can be attached to the nozzle, which may be used to assist in the atomization of the fluid, or valved and sprayed alone through the nozzle, as part of a clean-out procedure. No separate pumps are required to deliver the fluid to the nozzle; rather the air compressor or pressure system of the vehicle wash system can be used. This allows the use of bulk containers of tire dressing and minimizes waste. Additionally, because air and fluid pressures can affect the shape and coverage pattern of fluid, a pressure regulator may be connected to the system controller and adjusted based on the pressures needed for specific tire and sidewall geometries. For example, larger sidewall profiles may need lower air pressure to achieve greater coverage, which can be communicated by the system 10 and adjusted via a controllable pressure regulator. Alternatively, hydraulic or pneumatic pumps, of a variety of types and configurations, may be used to pressurize the tire dressing fluid through tubes to the nozzle. In this configuration, air may be added to the tire dressing fluid—at the nozzle or upstream of it—to atomize the material.

Figure 17A:
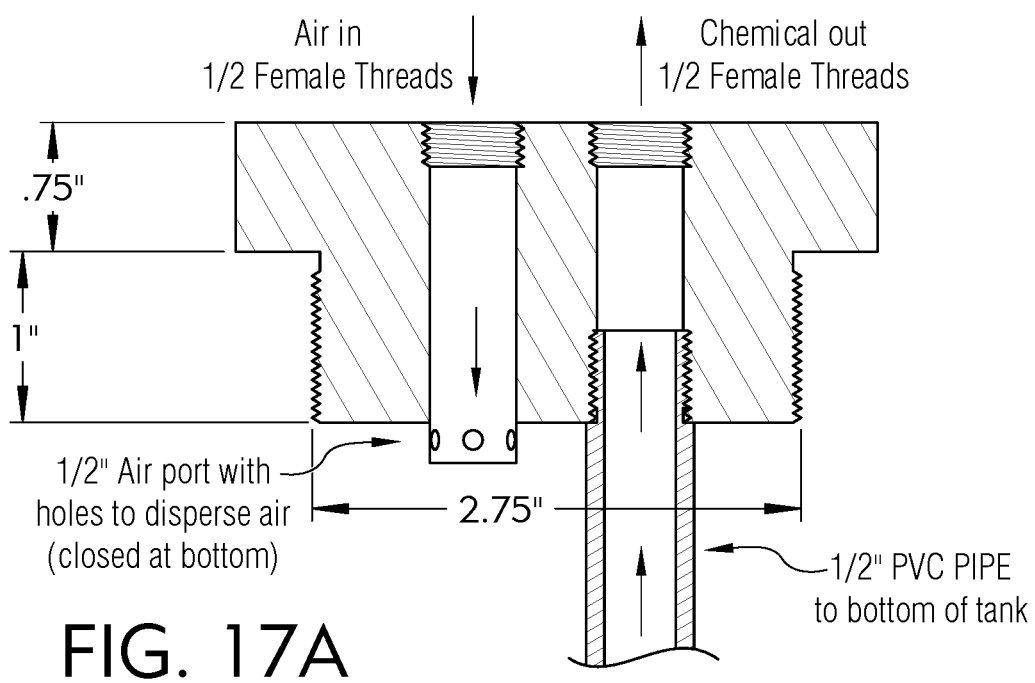
FIGS. 17A-17B illustrates a tire shine pressure head and various locations of components of the tire shine pressure head according to an example embodiment.
Figure 17B:
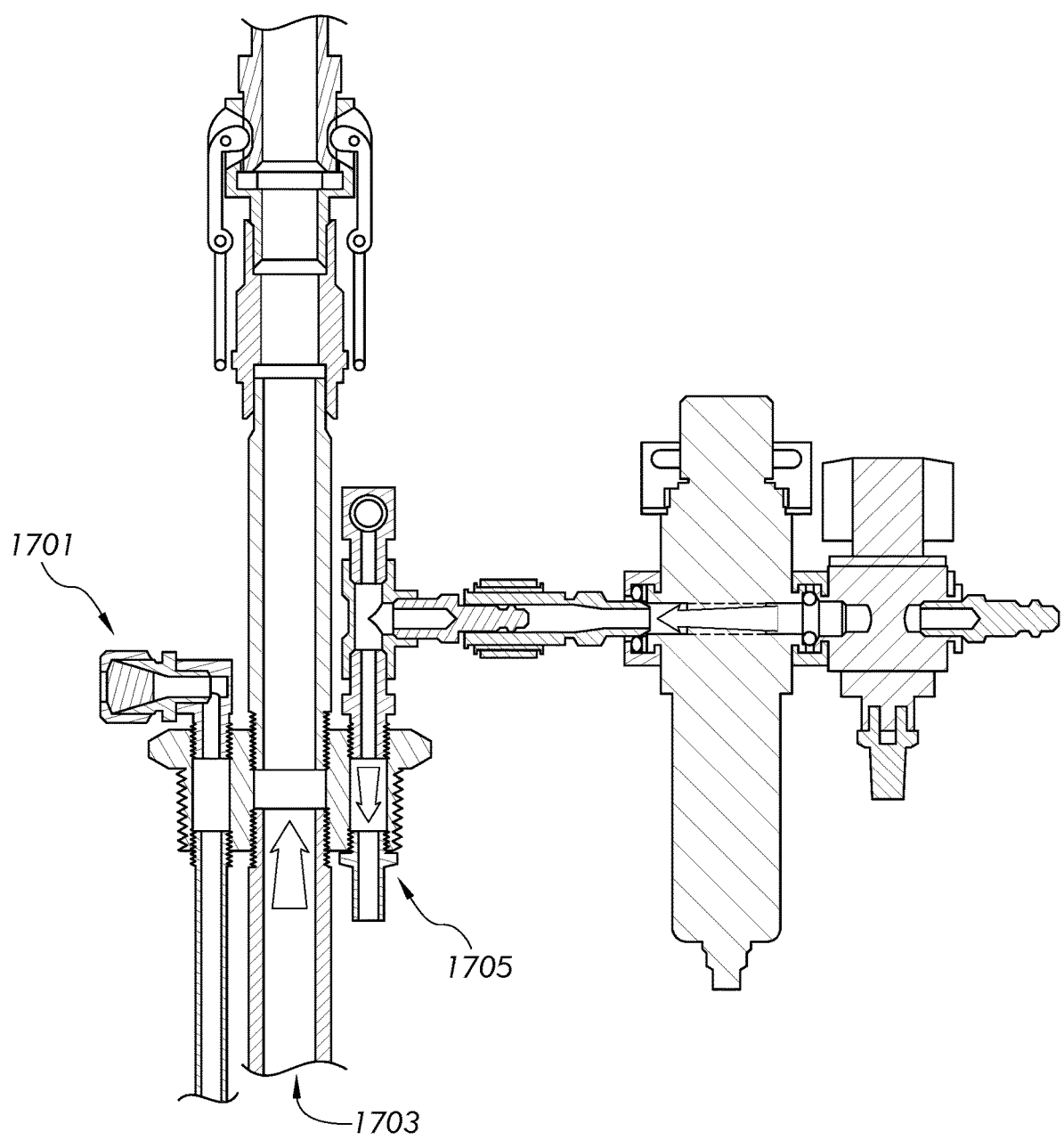

FIG. 17A illustrates a tire shine pressure head according to an example embodiment. Air in may be through ¼ inch female threads, and chemical out through ¾ inch female threads. The air port, such as air port 230, may be about half an inch with holes configured to disperse the air, and is closed at the bottom. A ½ inch PVC pipe may be coupled to the tank. It is understood that the dimensions disclosed herein are exemplary and non-limiting. FIG. 17B illustrates various locations of components of the tire shine pressure head according to an example embodiment. For example, FIG. 17B illustrates locations corresponding to a wire exist for a fluid level sensor location 1701, entry of a tire dressing fluid via a pipe location 1703, and compressed air into the tank through air port 1705.

FIGS. 18A-18G illustrate a tire dressing system in accordance with an example embodiment. FIGS. 18A-18G may refer to or incorporate any of the elements of system 10 as described above with respect to FIGS. 1-17.

Figure 18A:
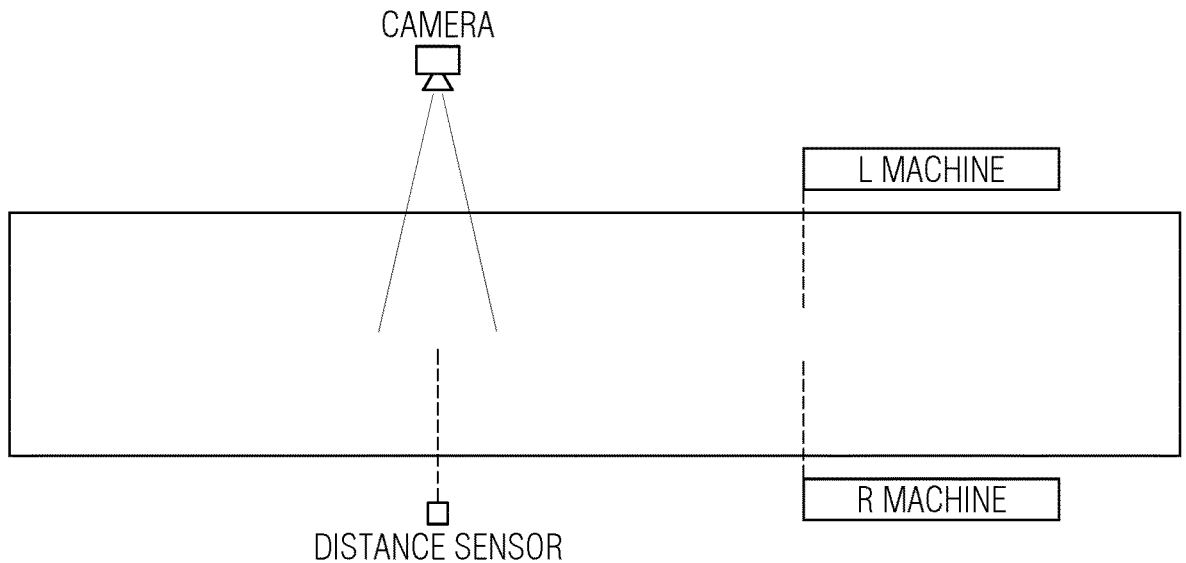
FIGS. 18A-18G illustrate a tire dressing system in accordance with an example embodiment.

The system 10 may include a conveyor, such as conveyor 30, configured to transport a vehicle 20 to be cleaned, a first tire dressing machine 70 provided on a left side of the conveyor 30, and a second tire dressing machine 75 provided on a right side of the conveyor 30. As shown in FIG. 18A, the first tire dressing machine 70 may be positioned opposite the second tire dressing machine. Each of the first and second tire dressing machines 70, 75 may include a sensor, such as a trip sensor (not shown) to indicate to the first and second dressing machines that a tire 60 has reached the machine(s). A depth camera 50 may be positioned on a first side of the conveyor 30 and a distance or depth sensor 55 may be provided opposite the depth camera 50. As no vehicle 20 is provided in FIG. 18A, both a queue of the first tire dressing machine 70 and a queue of the second tire dressing machine 75 may be recognized by a controller 80 as empty or null. It is to be appreciated that 2D cameras may be used in place of depth cameras as described herein.

Figure 18B:
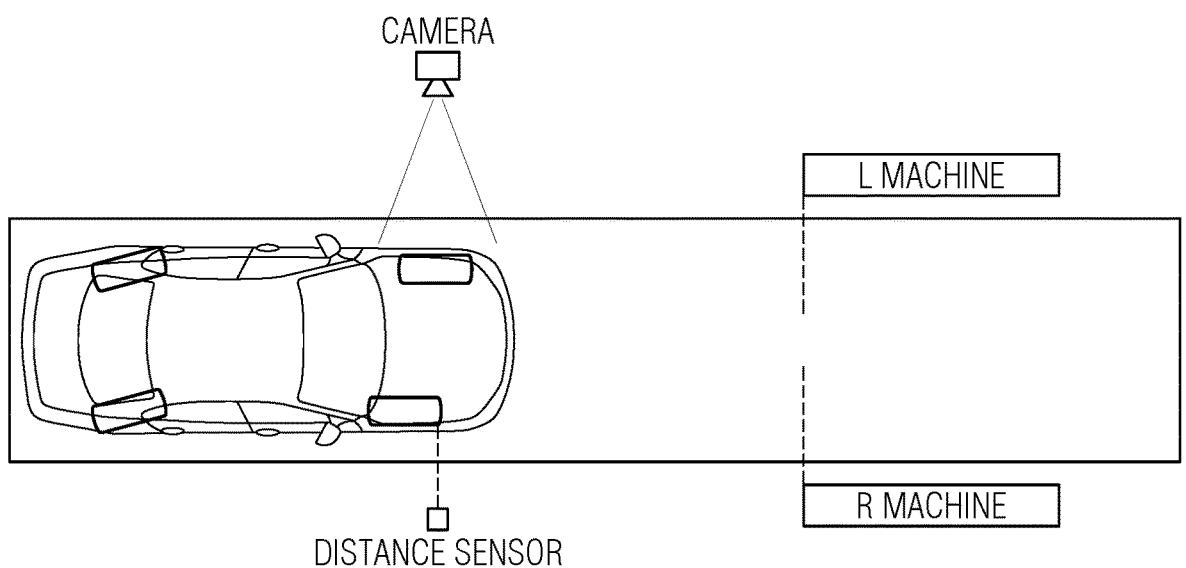

Turning now to FIG. 18B, a vehicle 20 positioned on the conveyor 30 has entered the system 10. The camera 50 detects a tire 60 of a first front vehicle tire and the distance sensor 55 detects a second front vehicle tire. Specifically, the system 10 includes a controller 80, as discussed above, that is operably connected to the camera 50 and the distance sensor 55, which calculates the distance from the camera 50 to the first front vehicle tire along multiple points on the tire 60, and also reads a distance from the distance sensor 55 to the second front vehicle tire along multiple points on the tire 60. Thus, the controller 80 determines an angle and camber of the front tires 60, an approximate size of the front tires 60, and a width (w) between the first and second front vehicle tires 60. Information for each tire 60 may be stored in a corresponding tire queue.

Figure 18C:
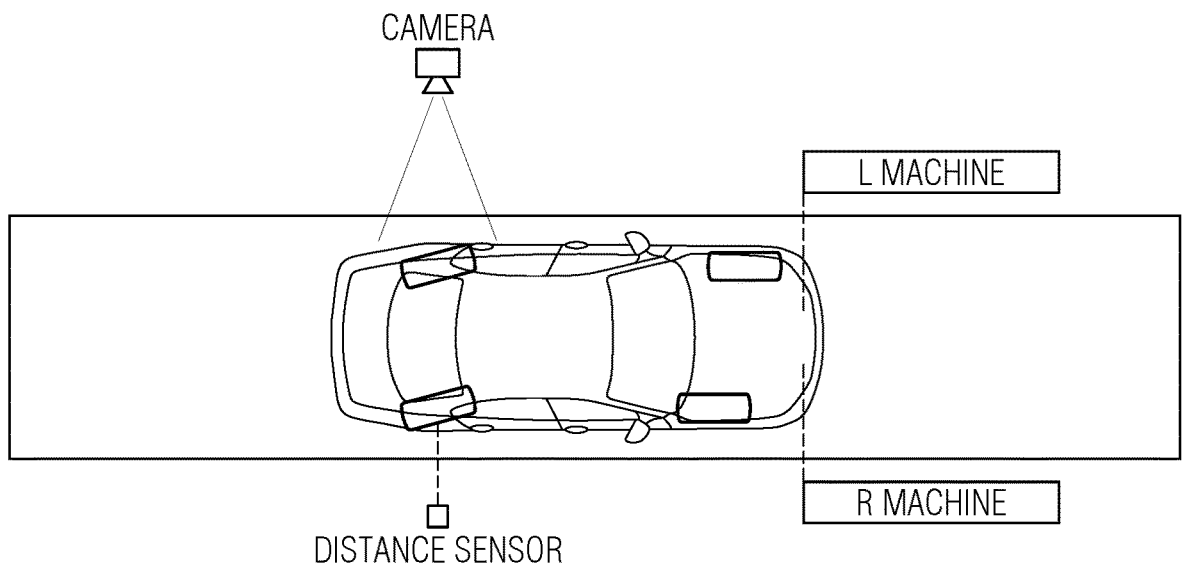

FIG. 18C illustrates a position of the vehicle 20 as first and second rear vehicle tires 60 are detected by the camera 50 and the distance sensor 55. As with the front vehicle tires 60, the controller 80 calculates the distance from the camera 50 to the first rear vehicle tire 60 and also reads a distance from the distance sensor 55 to the second rear vehicle tire 60. Thus, the controller 80 determines an angle and camber of the rear tires 60, an approximate size of the rear tires 60, and a width between the first and second rear vehicle tires 60, as well as a calculated rate of velocity determined by comparing time stamps for similar locations detected on the front and rear tires 60. Information for each tire 60 may be stored in a corresponding tire queue.

In other examples, a plurality of points on a tire 60 with a respective time stamp may be used to calculate the velocity. In some examples, this calculation may be for the front tire 60. Thus, when comparing a plurality of images of the tire 60 for each of these plurality of points, taking into account a positioning such as the center, the front, the back, or the side, the top or the bottom of the tire 60, as long as it is the same point for that tire that is observed for the different images can the velocity be calculated. In other examples, plurality of points on a rear tire 60 may be used instead. And further, the calculation may be for the plurality of points for each of the front and rear tires 60. In other examples, the velocity may be calculated based on comparing a point that is measured on a front tire 60 with a time stamp relative to a point measured on a rear tire 60 with a time stamp.

In some examples, analysis of images that capture the vehicle tire may not be used to calculate the velocity. Instead, a plurality of sensors, including but not limited to two sensors, may be placed at a predetermined distance relative to the conveyor and vehicle, in which a first sensor may be tripped to start a clock and a second sensor may be tripped to stop the clock. In some examples, the sensors may be placed within a few inches of each other and/or within a few inches above ground level. In other examples, the sensors may be arranged to accommodate for limited or constricted floor spacing relative to the conveyor. According to this implementation, the velocity may be derived, such as in inches per second. The sensors may comprise an optical tripwire. These sensors may be in communication with the controller to transmit the calculated time measurement for determining the velocity. This derivation of the velocity may, in some circumstances, be preferable and reliable over the image analysis velocity determination since the images may be subject to lighting, resolution and other parameters.

Figure 18D:
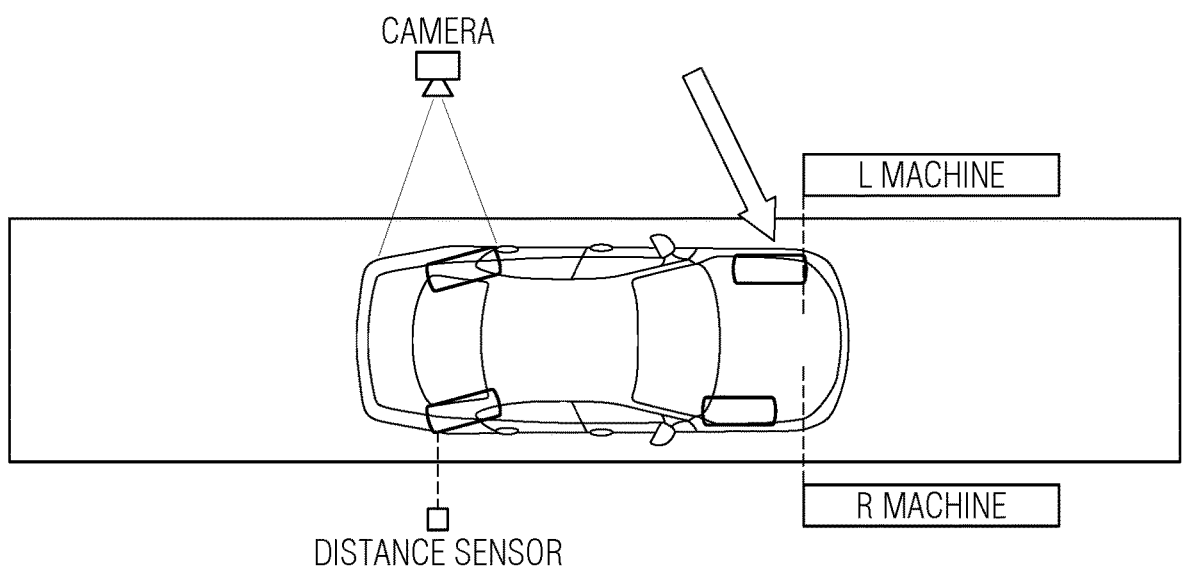

As shown in FIG. 18D, the first tire dressing machine 70 detects the first front vehicle tire and obtains the information for the tire 60 from the tire queue. The first tire dressing machine 70 then begins to apply the tire shine material to the sidewall of the first front vehicle tire 60 in accordance with the obtained information.

Figure 18E:
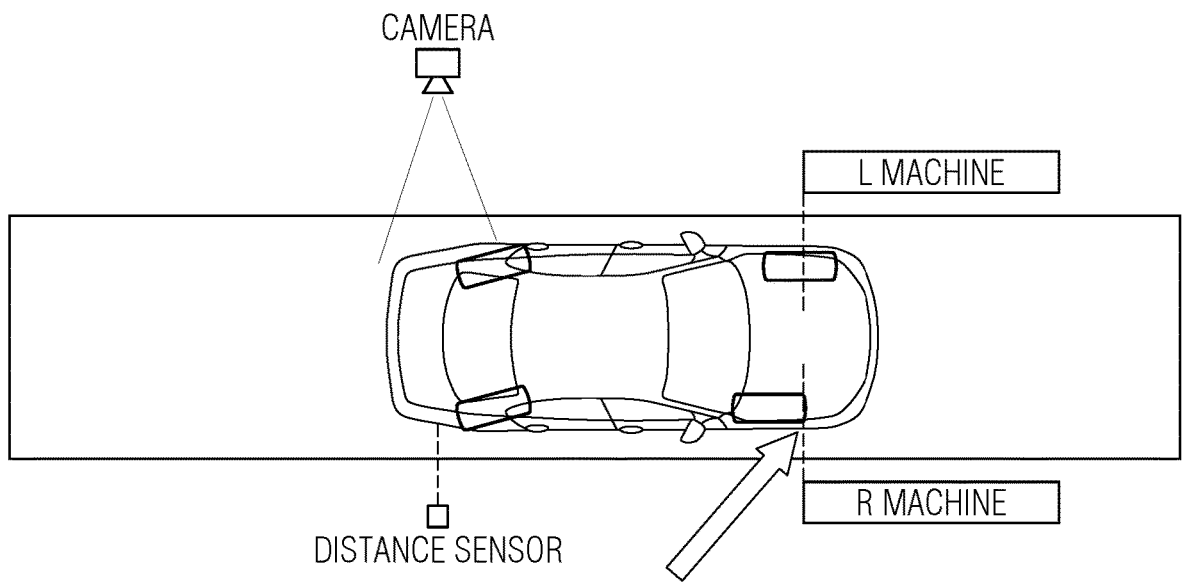

As shown in FIG. 18E, the second tire dressing machine 75 detects the second front vehicle tire 60 and obtains the information for the tire 60 from the applicable tire queue. The second tire dressing machine 75 then begins to apply the tire shine material to the sidewall of the second front vehicle tire 60 in accordance with the obtained information. Thus, the first and second tire dressing 70, 75 machine may be configured to operate independently of each other.

Figure 18F:
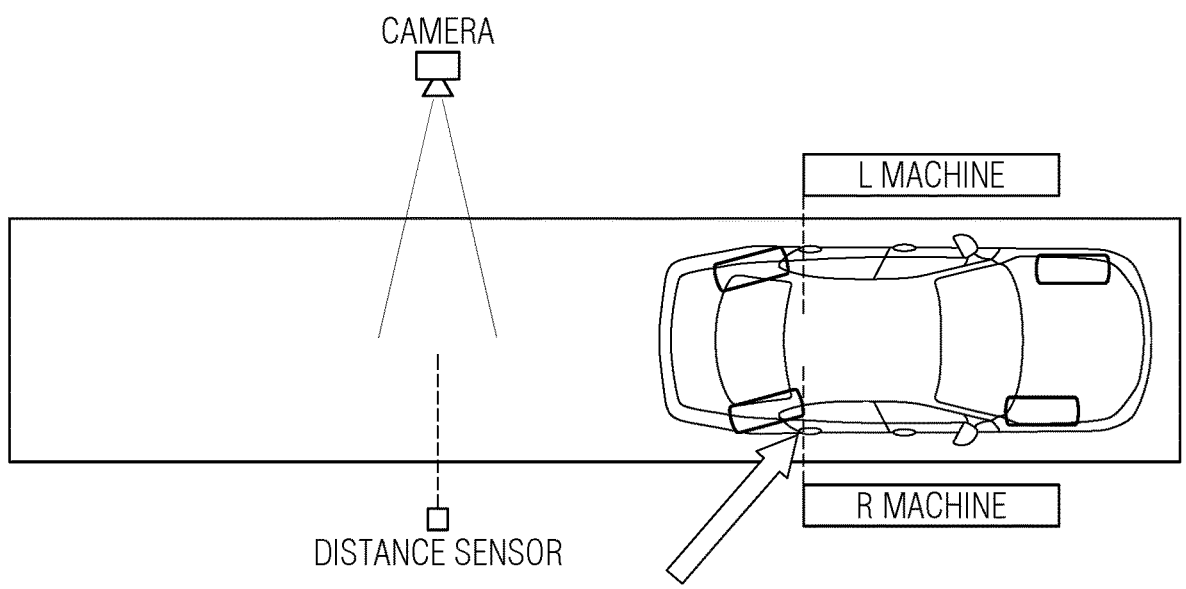

In FIG. 18F, the second tire dressing machine 75 detects the second rear vehicle tire 60 and obtains the information for the tire 60 from the tire queue. The second tire dressing machine 75 applies tire shine material to the sidewall of the second rear vehicle tire 60 in accordance with the obtained information.

Figure 18G:
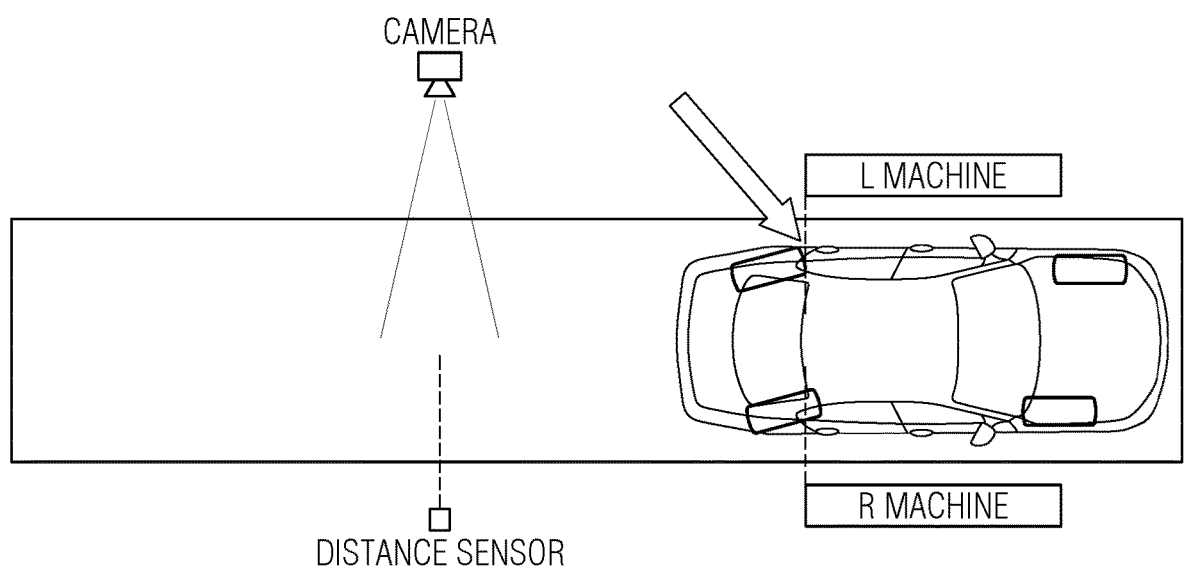

FIG. 18G illustrates the first tire dressing machine 70 detecting the presence of the first rear vehicle tire 60. The first tire dressing machine 70 then obtains the information for the tire 60 and applies the tire shine material to the first rear vehicle tire 60 in accordance with the obtained information.

As depicted in FIGS. 18A-18G, an orientation of the front tires 60 on the conveyor 30 may be different than an orientation of the rear tires 60 on the conveyor 30. Because the first and second tire dressing machines 70, 75 may move along x, y, and z axes, such different orientations may be accommodated. Each set of tires 60 is calculated independently from each other by the tire dressing machines 70, 75. This allows the tire dressing machines to apply the tire shine material to the tires 60 at a predetermined and constant distance between a surface of the tire 60 and the applicator or nozzle, regardless of the orientation of the tires 60 with respect to a vertical plane.

Figure 19:
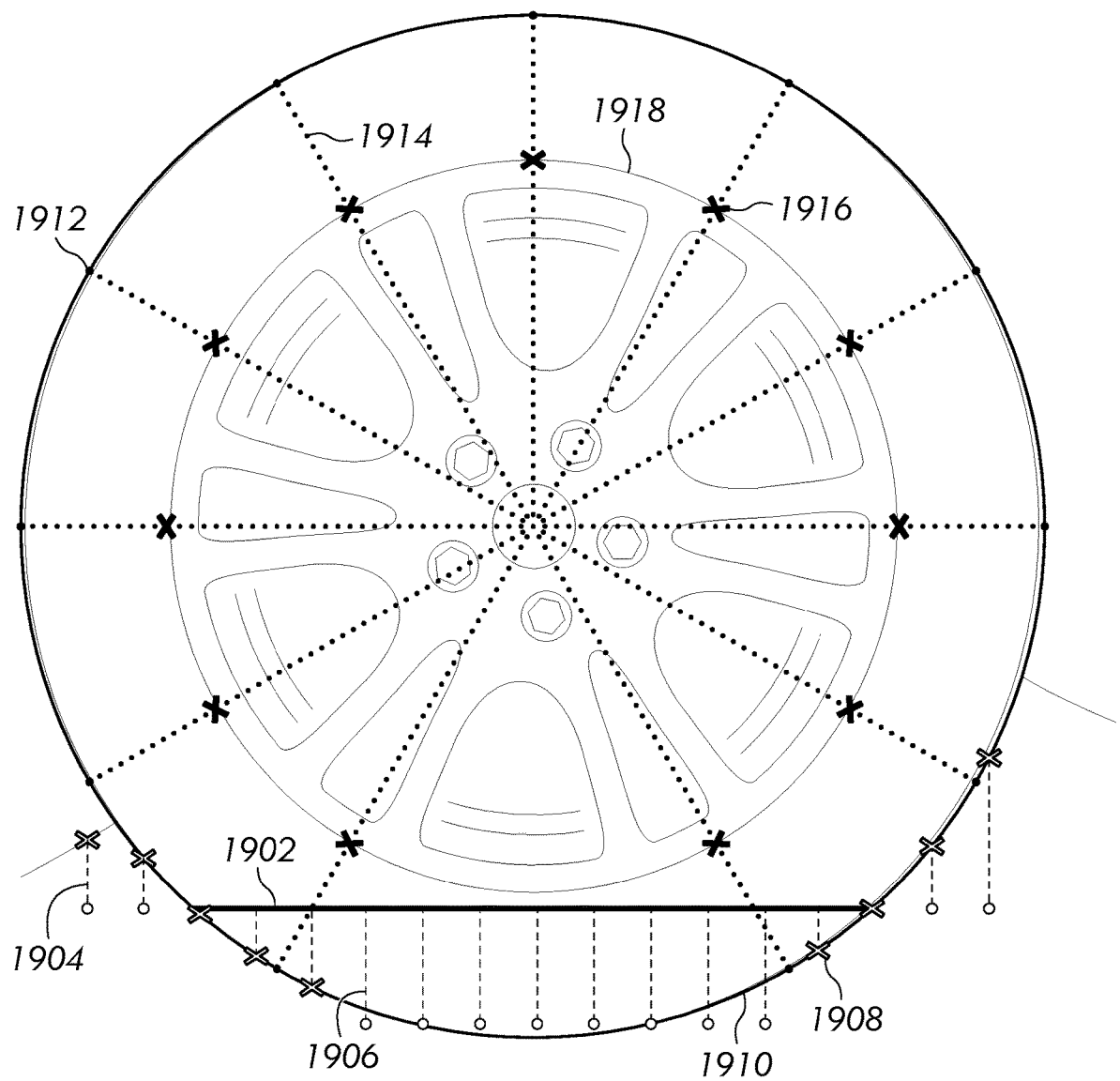
FIGS. 19 and 20 depict a method of a feature extraction technique according to an example embodiment.
Figure 20:
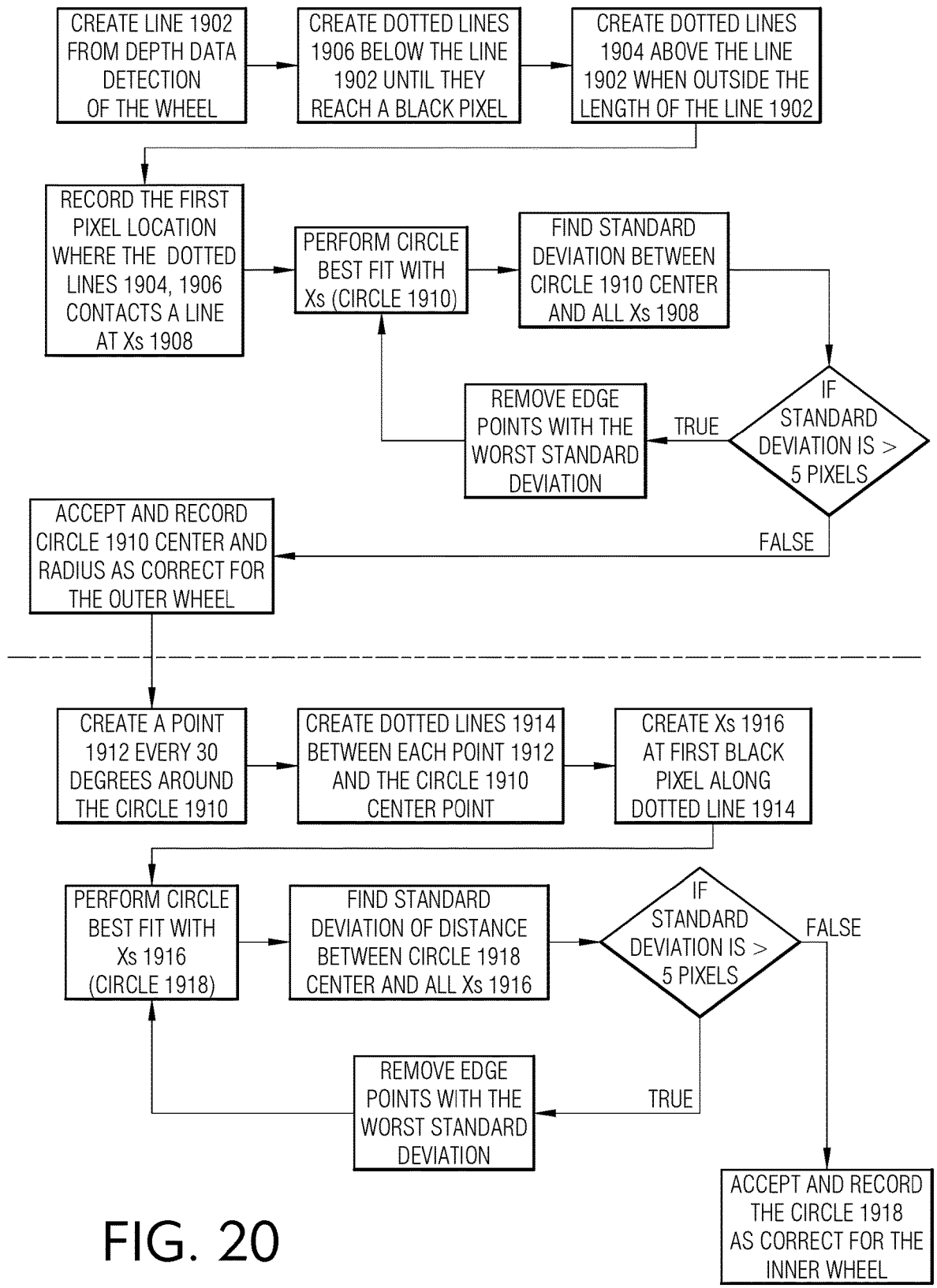

FIGS. 19 and 20 depict a method of a feature extraction technique according to an example embodiment, as further discussed below. FIGS. 19 and 20 may refer to or incorporate any of the elements of system 10 as described above with respect to FIGS. 1-18. In particular, the circle may be obtained from the Hough transform. In some examples, in degree increments of 15 degrees, a point is created along that circle, and looking at the center point of the circle to create a vector. Using that vector, it is incrementing along its path to search for black pixels that will constitute the rim diameter for edge detection. Once black pixels have been gathered, then a series of circle fits may be calculated to for the size of the rim diameter using one or more regression algorithms. In some examples, canny edge transform may be implemented to turns the image into black and white, black representing the detection of the edges around, for example, the rim, the bolts, and the like. In some examples, noise or artifacts may be detected during the edge detection process. To account for this, once the analysis of the 15 degree increments resulting in a total 360 degrees of plotting the points on the tire have been performed, outliers from the dataset may be removed relative to a standard deviation and this is repeated to have a low standard deviation.

Figure 21:
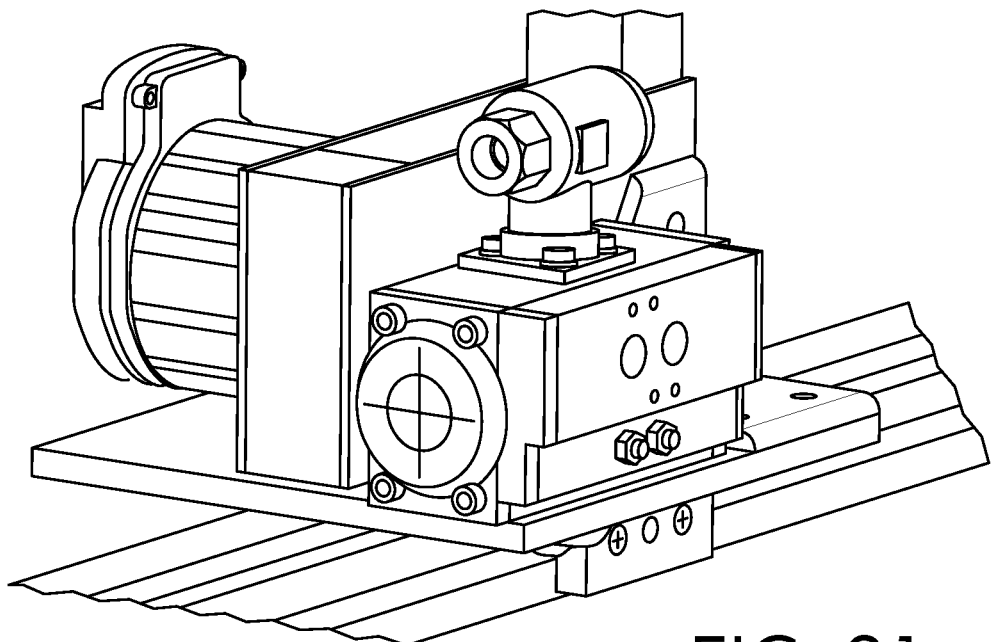
FIGS. 21-23 illustrate a motor system according to an example embodiment.
Figure 22:
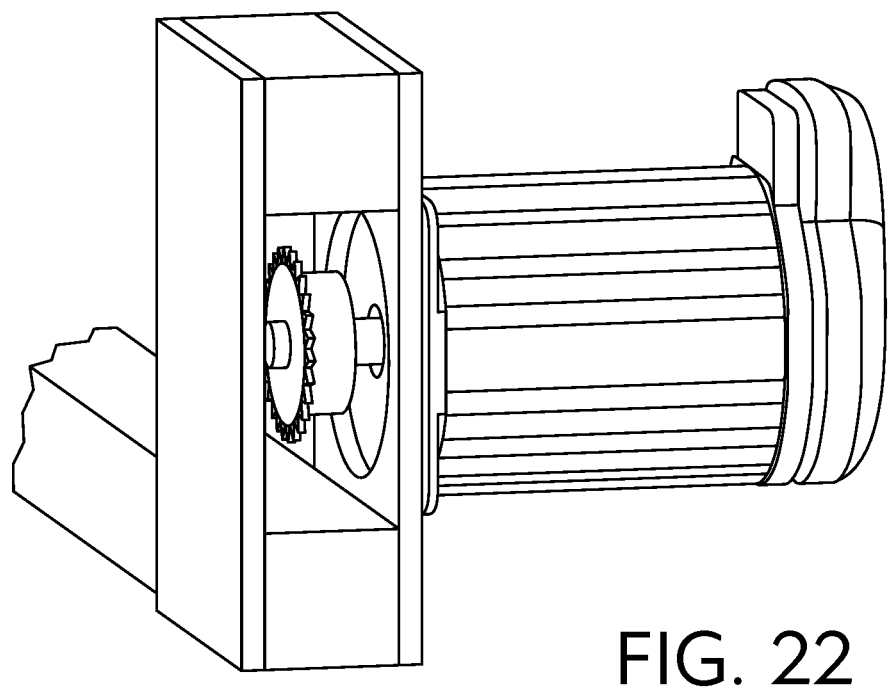
Figure 23:
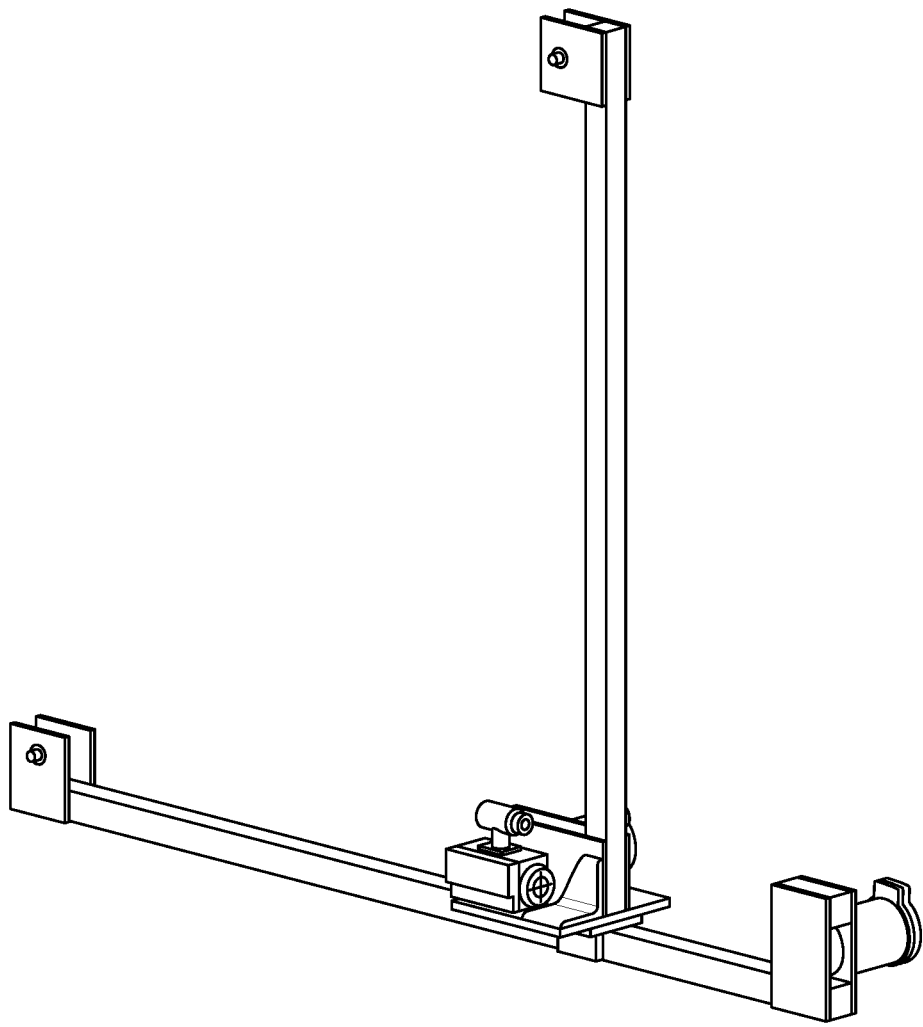

FIGS. 21-23 illustrate a motor system according to an example embodiment. FIGS. 21-23 may refer to or incorporate any of the elements of system 10 as described above with respect to FIGS. 1-20. FIG. 21 illustrates a valve and a motor system that may be configured to drive at least one axis. For example, the x-axis carrier may slide back and forth along the x-direction. FIG. 22 illustrates a close up view of the motor that would drive the x-axis along the movement of the vehicle. FIG. 23 illustrates a diagram of the system including that illustrated in FIGS. 21 and 22 and relative to various axes.

Figure 24:
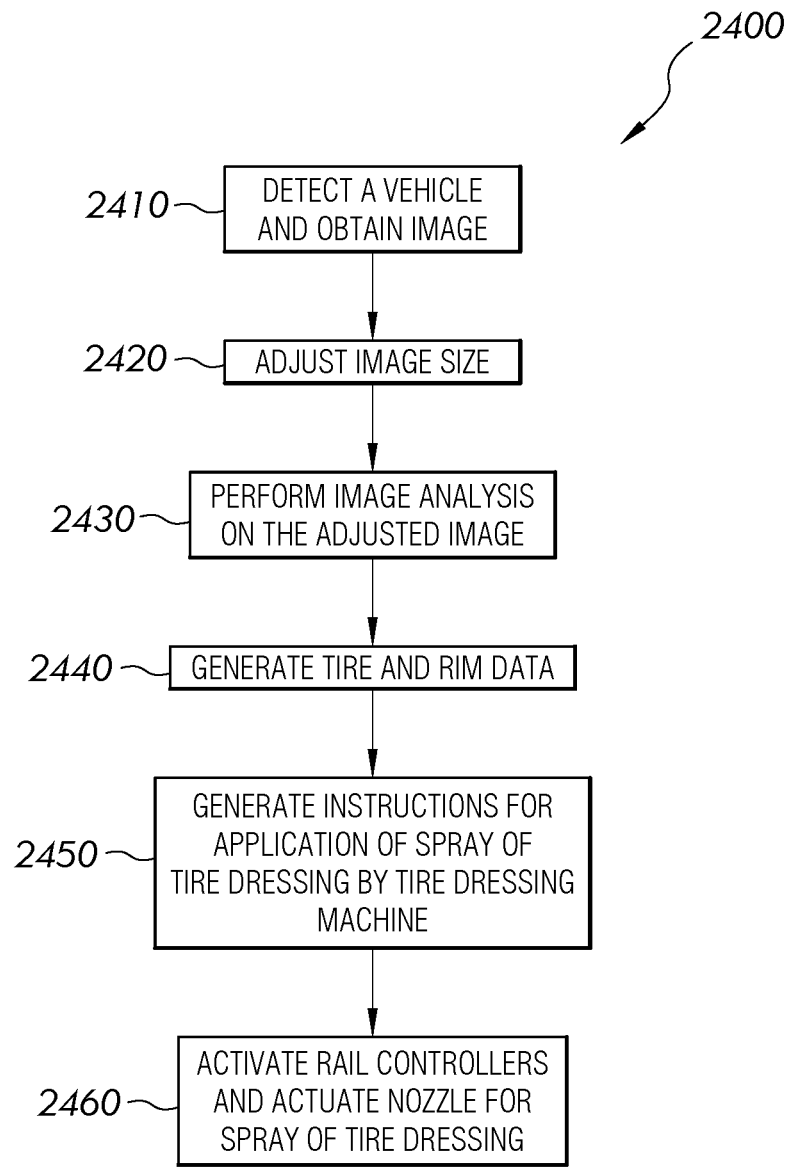
FIG. 24 describes an example method implemented by a tire dressing application system according to an example embodiment.

FIG. 24 describes an example method 2400 implemented by the tire dressing application system 10. FIG. 24 may refer to or incorporate any of the elements of system 10 as described above with respect to FIGS. 1-23.

At block 2410, the method 2400 may include sensing a vehicle. In some examples, an imaging device or depth sensor may be configured to sense a vehicle, such as vehicle 20. For example, a depth camera 50 or depth sensor 55 continuously flashes pulses toward a bottom portion of vehicle, such as at a predetermined height from a support surface of the vehicle. When the camera or sensor detects an object within a predetermined and relatively consistent depth to an edge portion of a conveyor, such as conveyor 30, the camera recognizes the object as a tire, such as tire 60. Once the object determined to be a tire, it provides a signal to the camera, which then takes an image of a portion of the vehicle which includes the wheel, or in some embodiments, a significant portion of the wheel and/or front end of the vehicle. The system may be configured to assume that a center of the wheel (vertical) will be at roughly a same horizontal (x-dimension) pixel location. This image is stored as a reference image and used for future analyses. The reference image may include include RGB color images of a front portion of vehicle, which includes the wheel as well as depth measurements for each pixel. The system registers as 'on' and leaves rest mode.

At block 2420, the method 2400 may include adjusting image size. For example, a plurality of steps may be taken to reduce the size of the image to make processing faster and more efficient for cycle time. In some examples, the image may be reduced in size, such as from 1280×1530 pixels down to 500×400, though it is understood that multiple reduction approaches may or may not be used.

At block 2430, the method 2400 may include performing image analysis using one or more algorithms. For example, a plurality of gaussian filters may run as well as a convolution filter to remove outlier color contrast data pixels and prepare the analysis for edge filtering. Thus, the system may be configured to implement a gaussian blur filter to a standard RGB image, then use a grayscale filter, prior to applying a canny edge detection algorithm. The system may be configured to implement edge filtering. For example, a series of canny binary edge filters, which turn the image black with white edges. Accordingly, the color is then inverted, and a threshold filter is applied in order to convert any gray pixels to black. It is to be appreciated that the above is merely an exemplary method of edge detection that may be implemented, and is not limited to such edge detection techniques. Rather, the system may be configured to use one or more other or additional edge detection methods such as canny, deriche, differential, sobel, prewitt, Roberts cross, and the like.

For example, a binary mask of filtered image may be compared against a set of binary edge filter reference maps. A pixel of interest is then assigned a one or zero value to denote whether an edge is detected.

[200 100 50
100 50 250
0 50 200]

The above matrix may be transposed and compared to a threshold, and in particular, to determine if it is greater than or equal to a mean value or less than. This information is then used to create a new matrix.

[1 1 0
1 0 1
0 0 1]

A center pixel is then compared to the reference matrix to determine if it is or is not an edge. If it is an edge, the pixel is assigned a value, such as 1, otherwise it is assigned a 0 value.

The edge filtered pixels, denoted as 'edges' or 1 s, may be transposed onto a list of edges to simplify future calculations. This may be first implemented for the image identifying the rim, and then the outer edge of the tire. In some examples, about 900 to 1000 images out of the original 500×400 image (200K) are considered edges.

At block 2440, the method 2400 may include generating tire and rim data. For example, the system may implement one or more algorithms, such as a feature extraction algorithm including a Hough Transform, to generate tire and rim data of the vehicle. Each of the coordinates of the positive edge values may be extracted from a generated list. Against each coordinate pair, a series of circles is generated, using that coordinate as a center point. For example, if 20,40 is determined to be a center point, the circle is assigned a radius r (which is equivalent to 1 pixel (or ⅛" in actual object size given an exemplary camera depth). The same radius r is then provided to each of the other 900+ coordinates deemed as edge values. In some examples, wheel size approximation calculations may be used to reduce the number of edge values fed into the one or more algorithms. Circles are generated from each of these points and then intersections are counted. Zones are created which are at the 4 pixel×4 pixel level, and essentially a histogram of frequency of intersections is tabulated for each intersection. Radii are applied about 49 more times to each edge location, each time becoming 1 pixel bigger. Identification may be made of the frequency of intersections of the circles, such as count, and the 4-pixel region it takes place in. Ultimately, the analysis will provide the center point of a circle and based on the edges identified and the two radii (e.g., a rim radius and a wheel radius) associated with edge drawings. In some examples, a machine learning algorithm may be generated, trained, and applied by the system. For example, a machine learning model may be configured to be trained to identify a tire based on raw binary input to determine key parameters of the tire, associate them with specific tire designs in a database, and predict and/or match future tires with similar parameters to the pre-defined tire dimensions.

At block 2450, the method 2400 may include generating data to drive the tire dressing machine. For example, a data stack may be created to drive the motors of the tire dressing machines 70, 75. Once the circles are defined, a data "stack" may be generated with the following information: Center point defined by x,y; a first radius, an integer; a second radius, an integer; a depth distance, an integer (this may be based on the depth image of a pixel from the reference image of the front wheel, which may be offset from the center point by a predetermined distance); an angle of the plane of the wheel closest to the tire dressing machine(s) 70, 75 (this may be calculated from several depth measurements taken at different points on the wheel to help determine if the wheel is turned or not parallel to the edge of the conveyor or by using a second 2D camera as described herein); an angle of opposing wheel (this may be calculated as 90-degrees minus the angle of the wheel); and an angle of the vehicle (this may be calculated from several depth measurements taken at different points on the vehicle to help determine the vehicle's orientation to the edge of the conveyor or the tire dressing machine). Upon completion of these steps (such as Boolean, yes or no), the results of the above analysis may be used in queuing the instructions for the tire dressing machines to drive the motor thereof.

In addition, one or more additional instructions may be generated and implemented based on other variables. For example, in addition to circle geometries, a line speed, or speed of the moving vehicle, and position and angle of the rear wheel may be obtained so a shape of the trajectory of the nozzle may be controlled. This may be accomplished by: taking a series of images (3D and 2D) of the vehicle after an initial reference image is captured by any of the imaging devices, retrieving images further back in the vehicle, determined to be the second wheel—these may be images taken approximately a second or more after the first image is taken. The reference image may be compared to an initial image. A percent color variance calculation may be conducted. When a difference drops to or below a predetermined threshold or percentage, such as 5% to 30%, the system may assume or interpret this to mean that a rear wheel has been identified and data from the image can be retrieved to create a separate data list with: a center point, which is assumed from an image determined to be the rear tire; a first radius, for the rim; a second radius, for the tire; a depth that is pulled from a same pixel location as reference photo; an angle of wheel that is calculated from several depth measurements taken at different points on the wheel to help determine if the wheel is turned or not parallel to the edge of the conveyor; an angle of opposing wheel that is calculated as 90-degrees minus the angle of the plane of the wheel; potential collision points that may be indicated by z-directional depth distances on the surface of the vehicle or rim which may come into proximity with the tire dressing machine. These points may be bounded approximately by points at or below the top of the wheel and within a calculated distance from the outer-most horizontal edge of the wheel such that it could be in proximity with the spray nozzle before it has had a chance to retract away from the vehicle following or prior to its spray routine.

Once a rear wheel is identified, a plurality of time stamps may be compared to it for a point on the wheel (such as the center point) to determine a rate at which the vehicle is moving. This information may be provided to the tire dressing machine motor controls. In some examples, another data point that may be provided to the tire dressing machine motor controls is a location of the wheel. This location may be calculated based on reference images intrinsics, which may include an algorithm allowing for the translation of an image location and calculated speed to be translated to physical location, based on a series of calculations which take into account the location of the camera from the wheel, the focal length of the lens, etc. This may then be fed into the data stack which uses it to begin the motion paths at the appropriate time.

At block 2460, the method 600 may include providing instructions to rail controllers. For example, gantry motors (x & y-axis linear rail controllers) are provided instructions for execution by a controller. In some examples, as indicated in the data stack and/or when triggered by a sensor on or upstream of a set distance from the tire dressing machine that indicates presence of the tire or wheel, a signal from the controller may transmit an instruction to the motors to begin working, and a chemical spray valve may be actuated to allow air and/or chemical to be expelled from a nozzle mounted to an end effector attached to the z-axis directional rail. Regarding the x-axis rail motor velocity, this may be defined by cosine*(current time/total time) to make 2 paths around the tire. Regarding the y-axis rail motor velocity, this may be defined by sine*(current time/total time) to make 2 paths around along with a reducer velocity so that the second circle does not come down all the way at the end of its first pass, and the second pass may begin at about 2-inches higher than the initial. This implementation may be used to provide a 4" to 5" wide spray pattern on each tire sidewall. Depending on calculated sidewall widths and the tire plane angle, the total spray pattern may be adjusted for upward or downward, by eliminating or repeating an identical second pathway around the tire. In other examples, an oblong spray nozzle may be rotated to minimize or maximize its spray coverage as desired. Additionally, for tires 60 turned at an angle relative to the tire dressing machine(s) 70, 75, the controller 80, via implementation of a control algorithm, may be configured take into account the rotation by decreasing the distance along the x-axis relative to the y, and adjusting the distance of the nozzle from the wheel for portions of the path in which the sidewall appears to be narrower, in order to match the spray pattern to the apparent sidewall dimensions.

In some examples, a spiral pathway may be used by the nozzle for spraying the tire dressing. For example, utilizing a spiral pathway (as opposed to identifying two different circles and starting and stopping for each location of a given circle) shortens the distance for travel of the spraying and also provides more uniform coverage or application over the two circle approach. In this manner, the start for circle one, the stop for circle one, and start for circle two and stop for circle two requires numerous stopping and starting and adjustment and longer distance by the nozzle, which can adversely impact system performance and efficiency. Moreover, there is a likelihood of double coverage if the nozzle sprays using the two circle approach, as opposed to the spiral approach. Thus, the pitch of the spiral pathway may be changed based on the thickness of the tire for the spray pattern. Accordingly, the spiral pathway presents numerous advantages for spraying of the tire dressing by the nozzle as opposed to the two circles technique. Additional factors that may be considered for the pathway of spraying the tire dressing may include the offsets from a z-axis to the tire; a diameter and/or shape of the nozzle; the spray pattern and/or shape; and/or the distance to the tire which affects the diameter of the pathway for spraying the tire dressing. Accordingly, the system 10 may be configured to control the nozzle to apply the spray pattern in a spiral pathway, in which it accounts for both the distance from the nozzle to the tire, and also the amount or pressure applied regarding the tire dressing, which may or may not be simultaneously considered. Additionally, for tires 60 turned at an angle relative to the tire dressing machine(s) 70, 75, the controller 80, via implementation of a control algorithm, may be configured to take into account the rotation by decreasing the distance along the x-axis relative to the y, and adjusting the distance of the nozzle from the wheel for portions of the path in which the sidewall appears to be narrower, in order to match the spray pattern to the apparent sidewall dimensions.

The z-axis motor may be controlled by the depth measurements and calculated tire plane and angle relative to the conveyor and/or machine x-axis guide. The tire dressing machine may be programmed to move to approximately 2" away from wheel and the z-axis motor may be configured to move the nozzle in and out to maintain a 2" distance, based on a calculated plane distance from the tire that is calculated from the depth measurements and angle data in the data stack. Another depth feature may depend on the calculated sidewall width, as measured by subtracting the inner radius from the outer radius. For example, if the sidewall width is 2" or less the tire dressing machine may be configured not to spray the product on the second pass. If side wall width is greater than 5", the gantry may be configured to move the nozzle back/away from the sidewall by a predetermined amount which will apply the right amount of coverage to the sidewall, or to run one or more additional passes around the wheel. Additionally, for tires 60 turned at an angle relative to the tire dressing machine(s) 70, 75, the controller 80, via implementation of a control algorithm, may be configured to take into account the rotation by decreasing the distance along the x-axis relative to the y, and adjusting the distance of the nozzle from the wheel for portions of the path in which the sidewall appears to be narrower, in order to match the spray pattern to the apparent sidewall dimensions.

As described above, the camera, distance or depth sensor(s), and controller may be collectively integrated and employed by the system to achieve detection and calculation of the actual or estimated tire parameters. A Hough transform, which is a feature extraction technique useful for identifying the dimensions of circles and ellipses, may then be used with the estimated parameters to determine tire sidewall dimensions for application of the tire dressing. One example of this is depicted in FIGS. 19 and 20.

Figure 25:
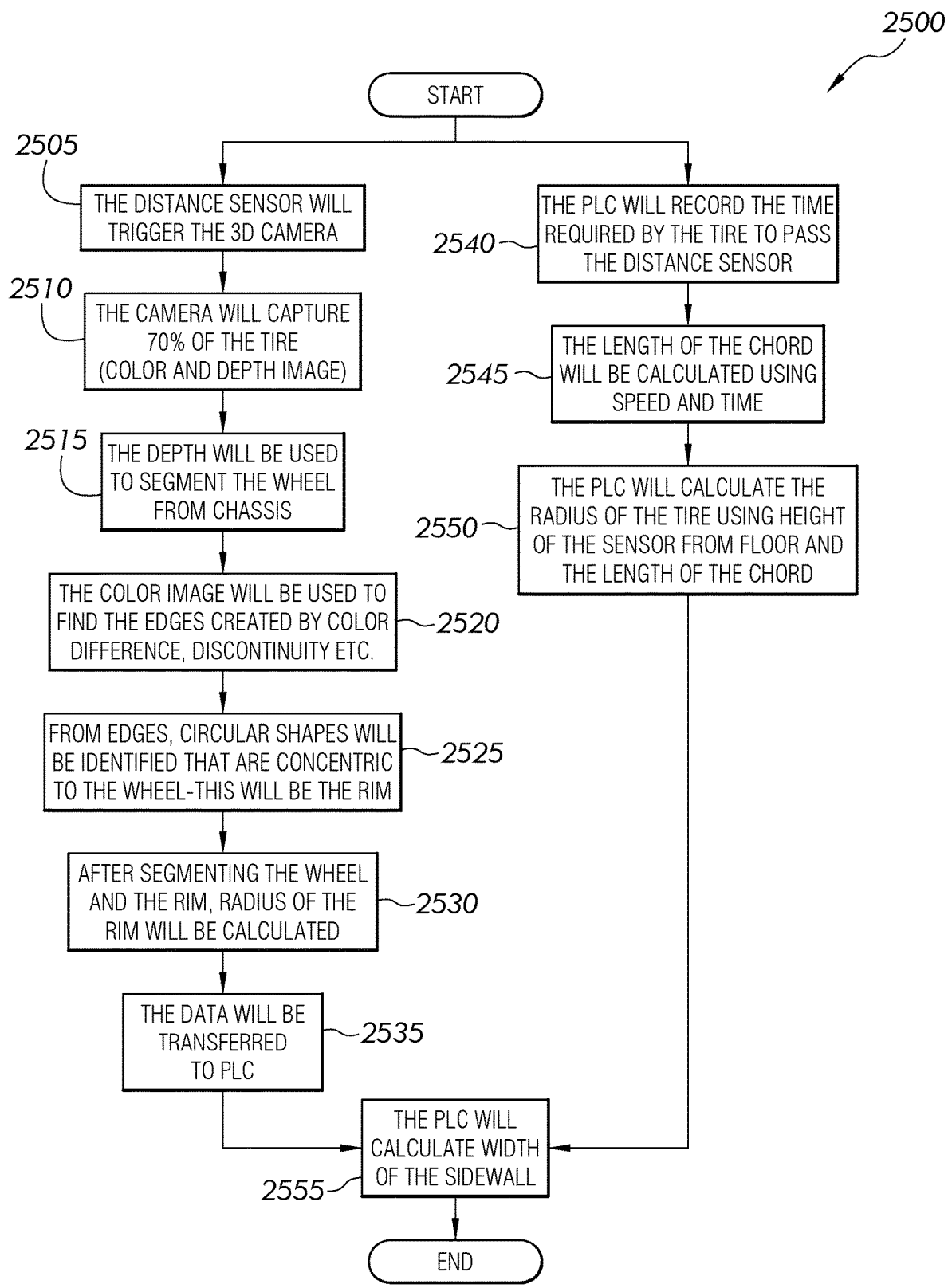
FIG. 25 illustrates another method of detecting and calculating tire parameters for the tire dressing machine according to an example embodiment.

FIG. 25 illustrates another method 2500 of detecting and calculating tire parameters for the tire dressing machine. FIG. 25 may refer to or incorporate any of the elements of system 10 as described above with respect to FIGS. 1-24. Just as with any of the above figures, a controller, including but not limited to a programmable logic controller (PLC), may be used, and in particular, to calculate a width of a sidewall of a tire.

At block 2505, the method 2500 may include triggering a camera, such as a Kinect2® camera, by a sensor, such as a distance or depth sensor based on detection of a vehicle and its tire. It is understood that other three-dimensional cameras may be used. At block 2510, the method 2500 may include capturing a portion of the tire. In some examples, the camera may be configured to capture 70% of the tire, including color and depth image. At block 2515, the method 2500 may include using the depth to segment the wheel from the chassis of the vehicle. At block 2520, the method 2500 may include identifying edges created by the color difference and discontinuity based on the colored image. At block 2525, the method 2500 may include identifying one or more circular shapes that are concentric to the wheel, which will be the rim, based on the identification of the edges. At block 2530, the method 2500 may include calculating a radius of the rim after segmenting the wheel and the rim. At block 2535, the method 2500 may include transferring the data to the controller. At block 2540, the method 2500 may include recording, by the controller, the time required by the tire to pass the distance or depth sensor. At block 2545, the method 2500 may include calculating the length of a chord using speed and the recorded time. At block 2550, the method 2500 may include calculating, by the controller, a radius of the tire using height of the sensor from the floor and the length of the chord. At block 2555, the method 2500 may include calculating, by the processor, a width of the sidewall.

In some examples, the camera may be configured to determine the diameter of the rim. For example, a 2D image of the tire may be used to determine the diameter of the rim. In some examples, a depth image of the tire can be used to obtain a distance between the tire and the camera.

In connection with the above method 2500, a sensor, such as a laser sensor, contact sensor, and/or proximity sensor, may be mounted before the gantry. When the laser sensor or edge detecting sensor recognizes the tire edge, then the 3D camera may be activated to capture the picture of the tire. A depth image may be used to segment the wheel from the car chassis. Once the region of interest ("ROI") for the wheel is obtained, a color image is used and edges can be found by the color difference, discontinuity etc. From the edges in the wheel ROI, circular shapes that are concentric to the wheel may be found, which may constitute the rim. Once the wheel and rim are segmented, the radii of each are calculated and used to find the tire dimensions.

In some examples, the diameter of the tire may be determined by using a distance sensor, such as the laser distance sensor. The width of the sidewall may be calculated by subtracting the diameter of the rim from the diameter of the tire. In some examples, the variations of the tire positions or orientations may affect the data from the laser sensor. The laser sensor may be mounted adjacent the floor or surface upon which the wheel is supported. For example, the laser sensor may be approximately 2-5 inches from the floor. A time required for the tire to pass the laser sensor may be recorded to calculate a length of chord BC, as discussed below regarding FIG.

Figure 26:
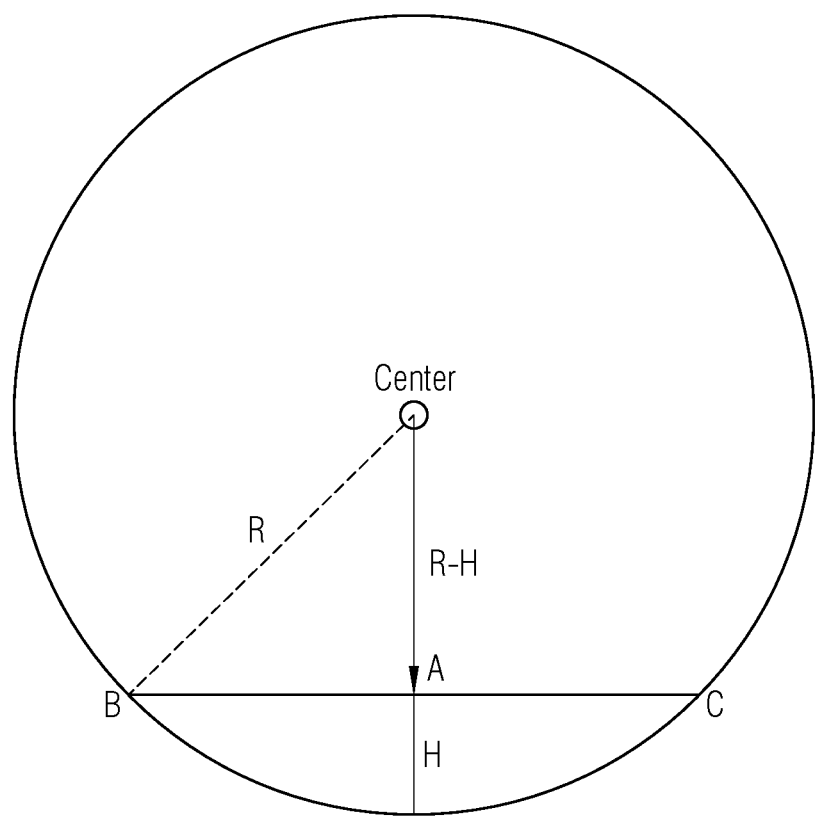
FIG. 26 illustrates calculation of a tire radius of a vehicle according to an example embodiment.

FIG. 26 illustrates calculation 2600 of a tire radius of a vehicle according to an example embodiment. FIG. 26 may refer to or incorporate any of the elements of system 10 as described above with respect to FIGS. 1-25.

For example, the vehicle may be translating at "S" inches per second and "t" is the time required for the car to pass the laser sensor. The length of the chord BC is calculated by: L=S*t. "H" is the height of the sensor from the floor or support surface. Applying Pythagoras theorem to triangle "OAB" yields $$R^2 = \left(\frac{L}{2}\right)^2 + (R-H)^2, \text{ and } R^2 = \left(\frac{L}{2}\right)^2 + R^2 + H^2 - 2RH,$$

and $R^2$ gets canceled leaving with $$2RH = \frac{L^2}{4} + H^2,$$

and finally $$R = \frac{L^2 + 4H^2}{8H}.$$

Therefore, by having the height and length of the chord, the radius of the tire can be calculated.

Alternatively, computationally intensive, high-resolution depth camera measurements may be used to directly calculate individual wheel dimensions and drive motion controllers. Because the 'bead' of a rim, where it intersects a tire sidewall, is a raised feature, of approximately 1 to 4 mm in height off the sidewall of a tire, a depth camera measurement may be used to identify this feature. In addition, the outermost edge of the tire may be easily detected against open space of the wheel well using this technique. Measuring points across the horizontal distance of the wheel may provide information used to calculate angle.

A depth camera may be configured to provide depth data for each region. This data is used to calculate a plurality of dimensions, such as rim bead, various rim components, space in fender well, open space, and rim space. Moreover, instead of using color filters, a distance sensing or height-based technique to detect, for example, the bead of the rim. If a tire speed is needed, multiple images taken with the depth camera may be compared. The camera may also determine, or provide sufficient information to determine, an angle of the tire with respect to a predetermined vertical plane.

Figure 27A:
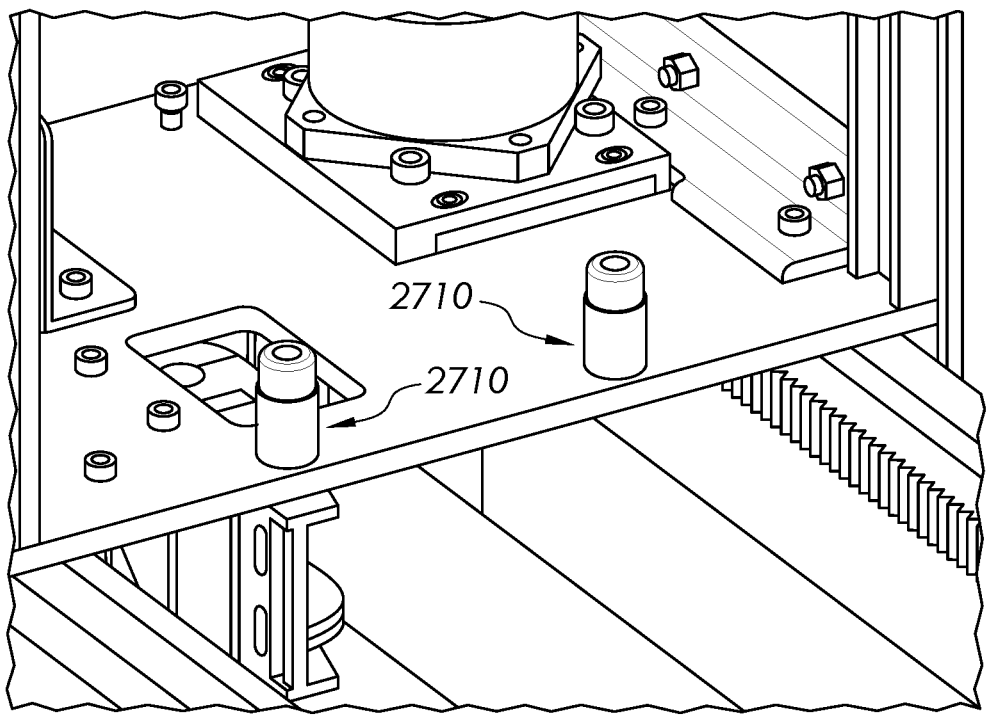
FIGS. 27A-27B illustrates an example of integrated switches and blocks according to an example embodiment.
Figure 27B:
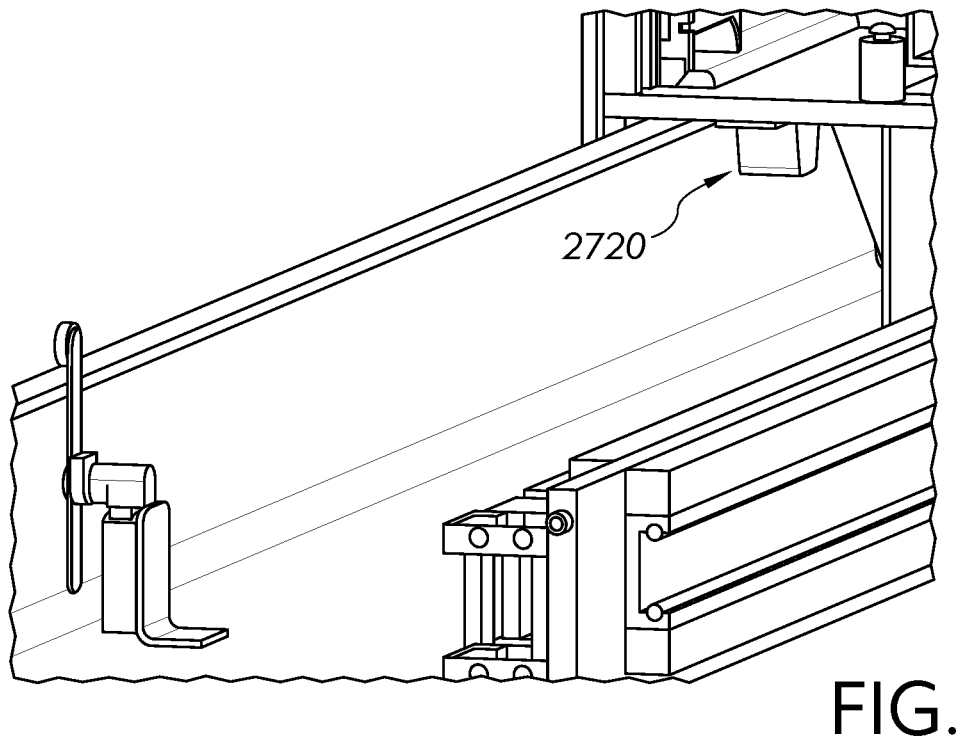

FIGS. 27A-27B illustrates an example of integrated switches and blocks according to an example embodiment. FIG. 27 may refer to or incorporate any of the elements of system 10 as described above with respect to FIGS. 1-26.

For example, the system 10 may also be configured to account for deceleration management, including utilization of limit switches 2710 and trip blocks 2720 or rubber bumpers, such as knowing when approaching too close to the end of a c-channel x-axis with acceleration limits. Limit switches 2710 may be configured for alignment purposes and to allow the motor encoders to reliably know where they are so that it knows how much space it has before it needs to know when to stop. The rubber bumpers 2720 may be used and helpful in low speeds, and as a safety precaution to aid in the stopping of movement.

Figure 28:
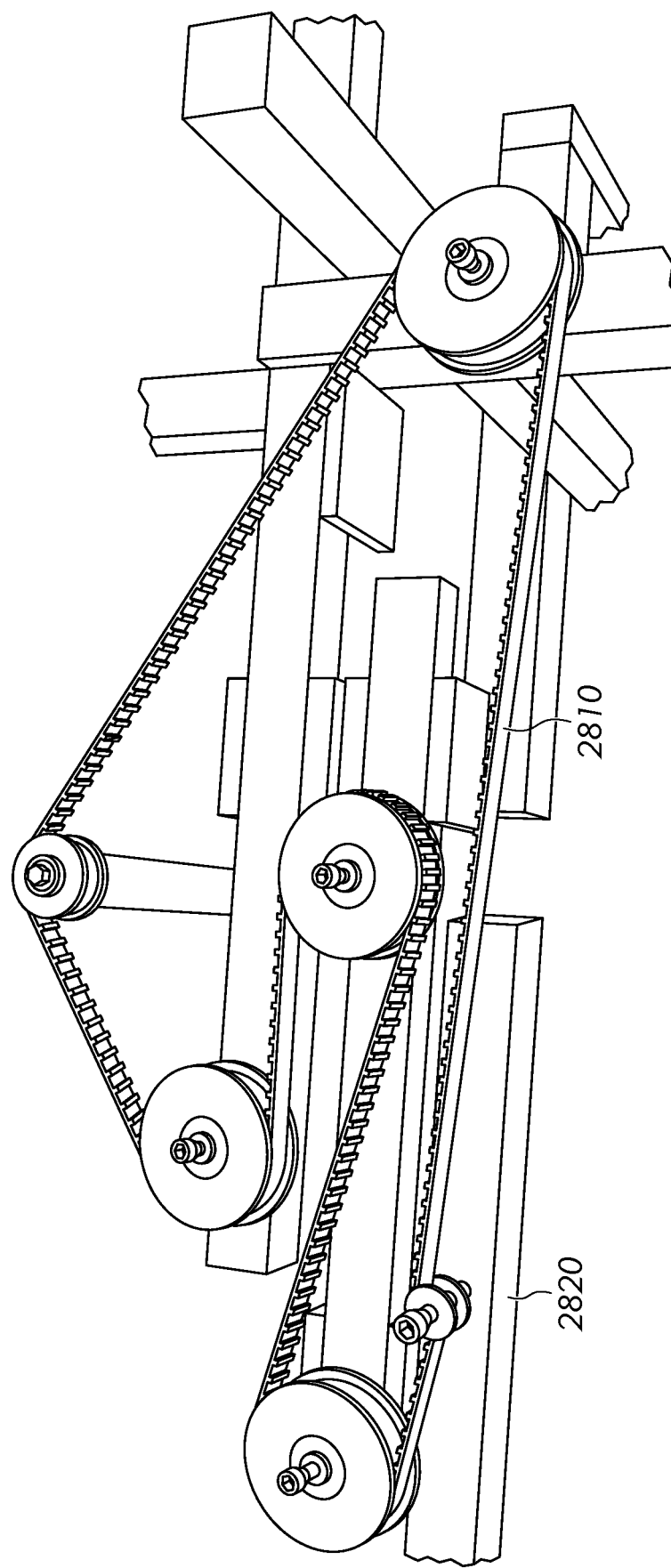
FIG. 28 illustrates a telescoping rail according to an example embodiment.

FIG. 28 illustrates a telescoping rail according to an example embodiment. FIG. 28 may refer to or incorporate any of the elements of system 10 as described above with respect to FIGS. 1-27. For example, the system 10 may incorporate a z-axis telescoping rail according to a first type of configuration. This first type of configuration may be a belt-driven telescoping rail. In particular, a three stage arm may be driven by a belt 2810. This provides a lighter weight rail 2820. In addition, such a configuration allows keeping of a motor attached to a carriage of the y-axis rail.

Figure 29A:
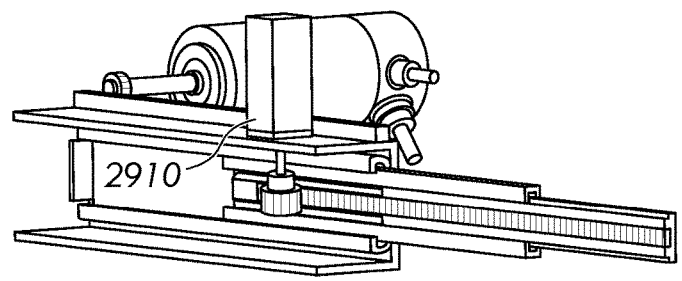
FIGS. 29A-29B illustrates a telescoping rail according to an example embodiment.
Figure 29B:
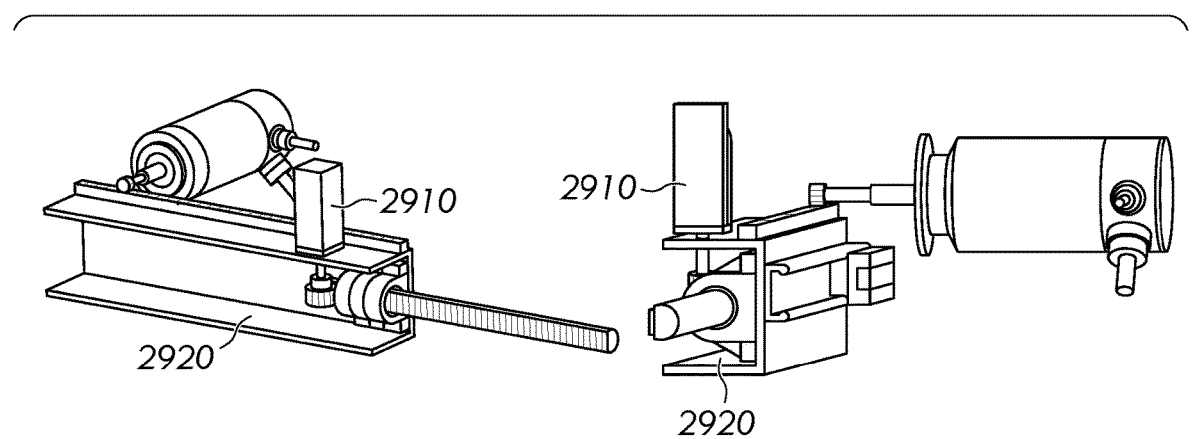

FIGS. 29A-29B illustrates a telescoping rail according to an example embodiment. FIG. 29 may refer to or incorporate any of the elements of system 10 as described above with respect to FIGS. 1-28. For example, the system 10 may incorporate a z-axis telescoping rail according to a second type of configuration. As illustrated in FIGS. 29A-29B, this second type of configuration may be a rack and pinion driven telescoping rail. In particular, a second motor 2910 may be attached to a z-axis rail 2920.

Figure 30:
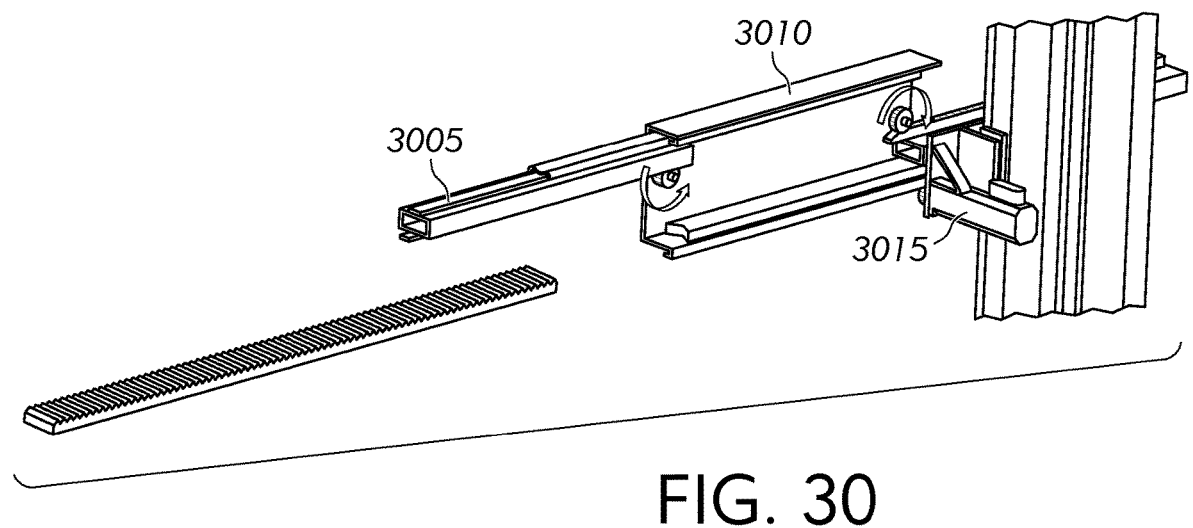
FIG. 30 illustrates a telescoping rail according to an example embodiment.

FIG. 30 illustrates a telescoping rail according to an example embodiment. FIG. 30 may refer to or incorporate any of the elements of system 10 as described above with respect to FIGS. 1-29. For example, the rail may refer to the second type of configuration as depicted with respect to FIGS. 29A-29B. In particular, this may include a moving channel 3010, an extending arm 3005, and a motor driving c-channel 3015.

Figure 31:
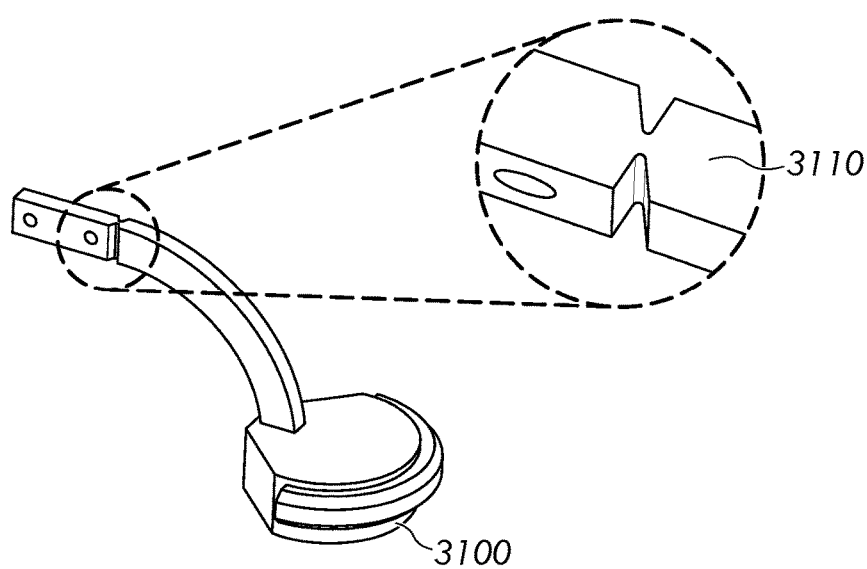
FIG. 31 illustrates a sprayer configuration according to an example embodiment.

FIG. 31 illustrates a sprayer configuration according to an example embodiment. FIG. 31 may refer to or incorporate any of the elements of system 10 as described above with respect to FIGS. 1-30. For example, the sprayer configuration 3100 may include a sprayer neck, which may be used in connection with the sprayer as previously described above. In some examples, the sprayer neck may be designed to include a stress concentrator 3110 at which there is the point of greatest bending stress exerted or otherwise applied on the neck.

As disclosed herein, the tire dressing application system may apply the proper or optimized amount of tire dressing to a highly variable mix of sidewall sizes, accurately and safely on moving or stationary vehicles. The tire dressing application system can detect the sidewall heights accurately because it uses techniques to extract wheel and rim features. For example, the tire dressing application system may employ Gaussian filtering and canny edge filtering to identify features, and Hough transform to calculate the circle dimensions. However, the tire dressing application system may also use a depth sensing approach and/or machine learning in which the system can look up the tire based on a pre-defined set of measurements. The tire dressing application system applies the tire dressing material accurately on the sidewalls by incorporating one or more concepts, including: multiple revolutions around the tire with each one slightly offset; adjusting distance from the wheel to make the spray pattern wider or smaller; rotating the spray nozzle to narrow or widen the sweep coverage; and use of one or more specially shaped end effectors that may protect a spray mist cloud from being affected by turbulent air flow from the environment, such as in a car wash. The tire dressing application system has a plurality of safety features, such as an ability to move toward and away from the vehicle to accommodate fenders, mirrors or parts which are at a different depth than the wheel, or which may present if the vehicle or tires are angled; a breakaway Z-arm which hinges or pivots away from the vehicle under a predetermined amount of force; a soft, conformable and/or breakaway end effector which is a first point of contact on a vehicle in an event of inadvertent contact which provides a non-mark/non-scratch contact point and crush zone to protect vehicle and machine. The tire dressing application system may apply dressing to stationary or moving wheels as the system is self-contained. The controller generates control instructions for robot motors. Speed measurements are used to drive each directional motor independently. The detection system allows the robot to identify the position of (localize) the stationary wheel and adjust all the robot parameters accordingly.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A tire dressing application system comprising:
a controller;
one or more imaging devices and/or sensors coupled to the controller; and
one or more tire dressing machines coupled to the controller, wherein
the one or more imaging devices and/or sensors are configured to capture data of a tire, and transmit the data of the tire to the controller, the data of the tire including at least one of an alignment and a rotation of the tire with respect to a vertical plane, and
the controller is configured to perform, via one or more algorithms, an analysis on the data of the tire received from the one or more imaging devices and/or sensors and transmit, based on the analysis, one or more instructions to the one or more tire dressing machines to apply tire dressing to the tire, and
wherein the analysis on the data of the tire includes determining at least one of an angle and a camber of the tire with respect to the vertical plane,
wherein the one or more instructions includes how to apply the tire dressing to accommodate the angle and/or camber of the tire.

2. The tire dressing application system of claim 1, wherein at least one of the one or more tire dressing machines comprises: a tire dressing applicator; a first linear guide system; and a second linear guide system, wherein the tire dressing applicator is configured for linear reciprocal motion along each of the first and second linear guide systems.

3. The tire dressing application system of claim 1, wherein the one or more imaging devices and/or sensors includes any number of depth sensors or any number of 2D cameras.

4. The tire dressing application system of claim 1, wherein the one or more imaging devices and/or sensors includes at least one depth sensor and at least one 2D camera.

5. The tire dressing application system of claim 1, wherein the one or more tire dressing machines includes an end effector having a housing with a nozzle recessed therein, the nozzle configured to apply the tire dressing to the tire.

6. The tire dressing application system of claim 1, wherein the analysis on the data of the tire includes applying a Hough Transform to capture data and calculate tire geometries and dimensions.

7. The tire dressing application system of claim 1, wherein the controller is further configured to determine a time measurement associated with a vehicle.

8. The tire dressing application system of claim 1, wherein the one or more tire dressing machines includes a tire dressing applicator movable along a z-axis to maintain a predetermined distance between the tire dressing applicator and a surface of the tire to accommodate the angle and/or camber of the tire during application of the tire dressing.

9. The tire dressing application system of claim 1, wherein the one or more tire dressing machines includes an end effector that is configured to mitigate damage to at least one of a vehicle and the one or more tire dressing machines in the event of a collision.

10. The tire dressing application system of claim 1, wherein the one or more imaging devices and/or sensors are configured to capture data of a vehicle, the data of the vehicle including at least one of an alignment and a rotation of the vehicle with respect to the vertical plane.

11. The tire dressing application system of claim 10, wherein the controller is configured to transmit one or more instructions to the one or more tire dressing machines to accommodate a position of the vehicle when the vehicle is not parallel to the vertical plane.

* * * * *